(12) United States Patent
Maeng et al.

(10) Patent No.: US 11,385,643 B2
(45) Date of Patent: Jul. 12, 2022

(54) ARTIFICIAL INTELLIGENCE MOVING AGENT

(71) Applicant: LG ELECTRONICS INC., Seoul (KR)

(72) Inventors: Jichan Maeng, Seoul (KR); Taehyun Kim, Seoul (KR); Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 307 days.

(21) Appl. No.: 16/812,162

(22) Filed: Mar. 6, 2020

(65) Prior Publication Data

US 2021/0132607 A1  May 6, 2021

(30) Foreign Application Priority Data

Oct. 31, 2019 (KR) .......... 10-2019-0137070

(51) Int. Cl.
*G05D 1/00* (2006.01)
*G05D 1/02* (2020.01)
*G06N 3/04* (2006.01)
*G06N 3/08* (2006.01)
*G10L 15/22* (2006.01)
*G10L 15/18* (2013.01)
*G10L 15/16* (2006.01)

(52) U.S. Cl.
CPC .......... *G05D 1/0088* (2013.01); *G05D 1/0231* (2013.01); *G05D 1/0255* (2013.01); *G05D 1/0257* (2013.01); *G06N 3/04* (2013.01); *G06N 3/08* (2013.01); *G05D 2201/0203* (2013.01); *G10L 15/16* (2013.01); *G10L 15/1815* (2013.01); *G10L 15/22* (2013.01)

(58) Field of Classification Search
CPC .. G05D 1/0088; G05D 1/0231; G05D 1/0255; G05D 1/0257; G06N 3/04; G06N 3/08
See application file for complete search history.

(56) References Cited

U.S. PATENT DOCUMENTS

| | | | |
|---|---|---|---|
| 9,383,753 B1* | 7/2016 | Templeton | G01S 17/42 |
| 10,446,034 B2* | 10/2019 | Akamine | G08G 1/166 |
| 2012/0310466 A1* | 12/2012 | Fairfield | G05D 1/0246 |
| | | | 701/28 |
| 2014/0214255 A1* | 7/2014 | Dolgov | G05D 1/0276 |
| | | | 701/23 |
| 2018/0211536 A1* | 7/2018 | Akamine | G08G 1/166 |
| 2019/0092347 A1* | 3/2019 | Kim | G06V 20/56 |
| 2019/0120951 A1* | 4/2019 | Fischer | G01S 13/931 |

* cited by examiner

*Primary Examiner* — Ramsey Refai
(74) *Attorney, Agent, or Firm* — Lee Hong Degerman Kang & Waimey

(57) ABSTRACT

An artificial intelligence (AI) moving agent is provided. The AI moving agent includes a traveling actuator configured to drive the artificial intelligence moving agent, at least one sensor configured to obtain data for determining an occupied region, and at least one processor configured to determine an occupied region of one or more objects based on the data, and obtain an adjustment zone by resetting a restricted zone set by a user based on the occupied region of the one or more objects.

20 Claims, 22 Drawing Sheets

(a)

(b)

(a)

(b)

(a)

(b)

(a)

(b)

(a)

(b)

(a)

(b)

(a)

(b)

1811  1820
1830
(a)

1840
1811
(b)

(a)

(b)

ARTIFICIAL INTELLIGENCE MOVING AGENT

CROSS-REFERENCE TO RELATED APPLICATIONS

Pursuant to 35 U.S.C. § 119(a), this application claims the benefit of earlier filing date and right of priority to Korean Patent Application No. 10-2019-0137070 filed in the on Oct. 31, 2019, the contents of which are all hereby incorporated by reference in its entirety.

BACKGROUND

The present disclosure relates to a moving agent capable of resetting a restricted zone set by a user, based on an occupied region of an object.

Artificial intelligence (AI) is one field of computer engineering and information technology for studying a method of enabling a computer to perform thinking, learning, and self-development that can be performed by human intelligence and may denote that a computer imitates an intelligent action of a human.

Also, AI is directly or indirectly associated with the other field of computer engineering without being individually provided. Particularly, at present, in various fields of information technology, an attempt to introduce AI components and use the AI components in solving a problem of a corresponding field is being actively done.

Meanwhile, techniques for perceiving and learning the surrounding situation by using AI and providing information desired by the user in a desired form, or performing an operation or function desired by the user are being actively studied.

An electronic device that provides such various operations and functions may be referred to as an AI device.

A robot cleaner is a device that performs cleaning while traveling in an indoor space. Recently, in order to prevent the robot cleaner from accessing articles, lugs, and the like, a technology for allowing the robot cleaner to set a cleaning restriction zone has been developed.

In detail, Korean Patent Registration No. 10-1575597 discloses a robot cleaning system in which a user touches a screen to input a forbidden line for designating a no-traveling zone of a robot cleaner in a state in which an indoor space map is displayed. In this case, the robot cleaner performs cleaning without crossing the forbidden line.

In addition, there is a technique for setting a cleaning restriction zone by installing a signal. In this case, the robot cleaner may recognize the signal and does not enter the cleaning restriction zone.

However, all of these technologies cannot precisely set the cleaning restriction zone, there occurs a difference between an actually required cleaning restriction zone and a user-defined cleaning restriction zone. In addition, even if it is assumed that the precise setting is possible, a user needs to make much effort for the precise setting.

SUMMARY

The present disclosure provides a moving agent capable of resetting a restricted zone set by a user, based on an occupied region of an object.

An AI moving agent includes a traveling actuator configured to drive the artificial intelligence moving agent, at least one sensor configured to obtain data for determining an occupied region, and at least one processor configured to determine an occupied region of one or more objects based on the data, and obtain an adjustment zone by resetting a restricted zone set by a user based on the occupied region of the one or more objects.

The details of one or more embodiments are set forth in the accompanying drawings and the description below. Other features will be apparent from the description and drawings, and from the claims.

DETAILED DESCRIPTION OF THE EMBODIMENTS

Figure 1:
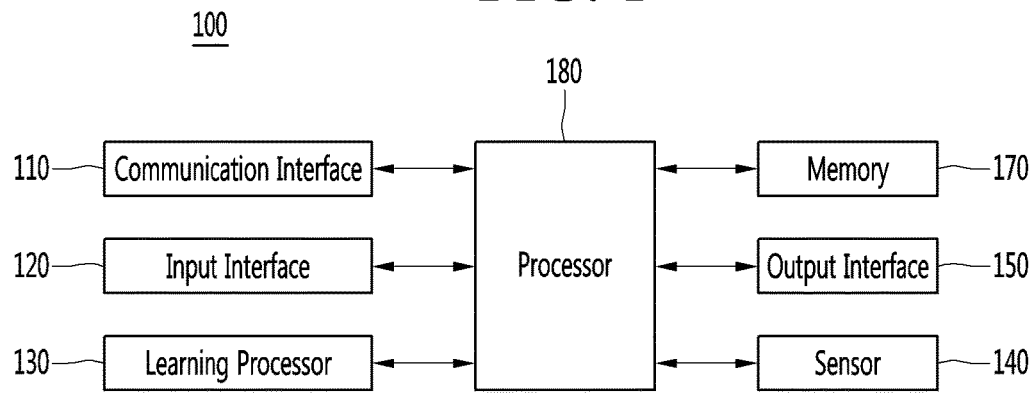
FIG. 1 illustrates an AI device 100 according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driver including an actuator or a motor and may perform various physical operations such as moving a robot joint. In addition, a movable robot may include a wheel, a brake, a propeller, and the like in a driver, and may travel on the ground through the driver or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication interface 110, an input interface 120, a learning processor 130, a sensor 140, an output interface 150, a memory 170, and a processor 180.

The communication interface 110 may transmit and receive data to and from external devices such as other AI devices 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensor 140 may acquire at least one of internal information about the AI device 100, ambient environment information about the AI device 100, and user information by using various sensors.

Examples of the sensors included in the sensor 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display for outputting time information, a speaker for outputting auditory information, and a haptic module for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI device 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
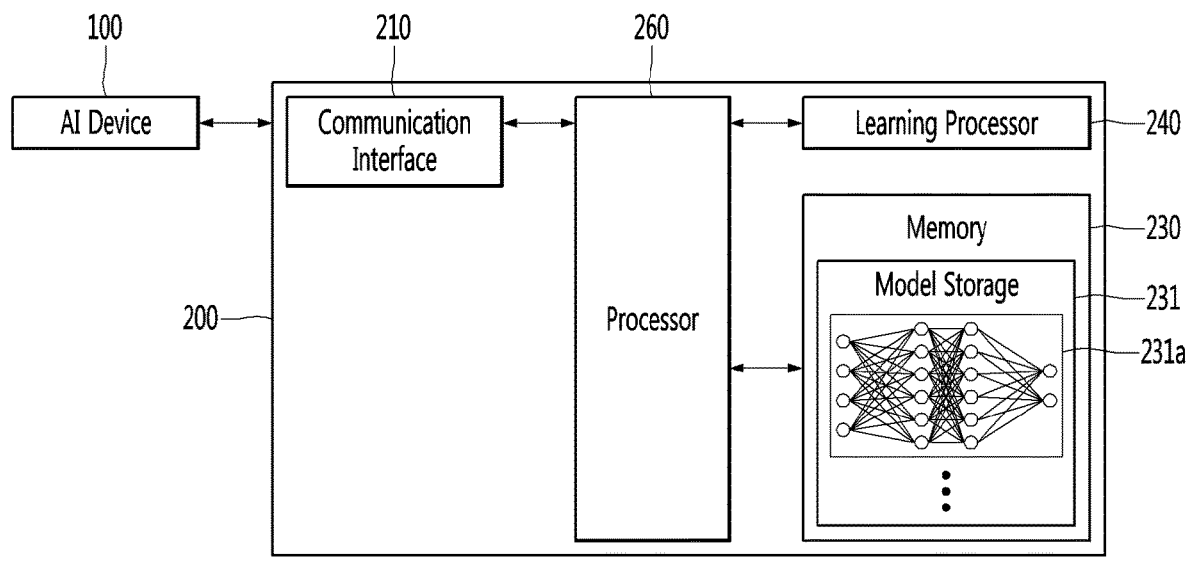
FIG. 2 illustrates an AI server 200 according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication interface 210, a memory 230, a learning processor 240, a processor 260, and the like.

The communication interface 210 can transmit and receive data to and from an external device such as the AI device 100.

The memory 230 may include a model storage 231. The model storage 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
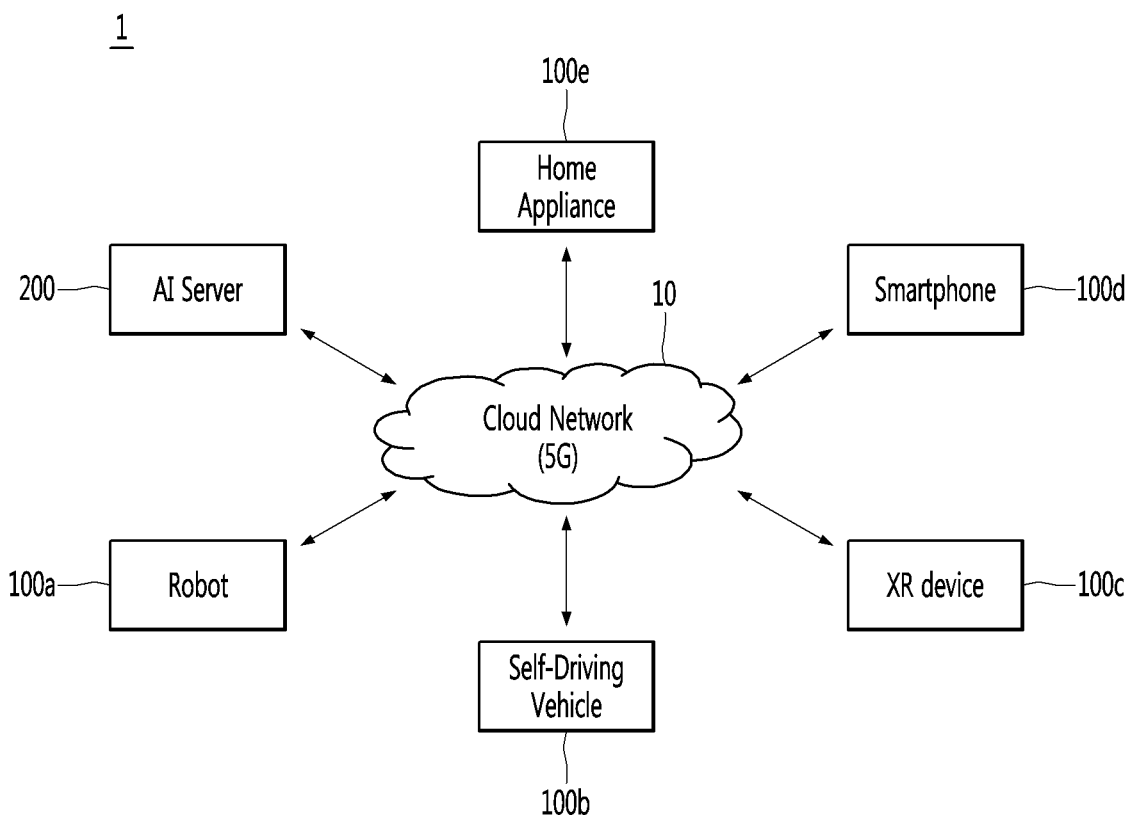
FIG. 3 illustrates an AI system 1 according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driver such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driver based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driver such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driver based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driver of the self-driving vehicle 100b. The function of the self-driving vehicle 100b controlled by the robot 100a may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

<AI+Robot+XR>

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100*a*, to which the XR technology is applied, may refer to a robot that is subjected to control/interaction in an XR image. In this case, the robot 100*a* may be separated from the XR device 100*c* and interwork with each other.

When the robot 100*a*, which is subjected to control/interaction in the XR image, may acquire the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100*c* or the user's interaction.

For example, the user can confirm the XR image corresponding to the time point of the robot 100*a* interworking remotely through the external device such as the XR device 100*c*, adjust the self-driving travel path of the robot 100*a* through interaction, control the operation or driving, or confirm the information about the surrounding object.

<AI+Self-Driving+XR>

The self-driving vehicle 100*b*, to which the AI technology and the XR technology are applied, may be implemented as a mobile robot, a vehicle, an unmanned flying vehicle, or the like.

The self-driving driving vehicle 100*b*, to which the XR technology is applied, may refer to a self-driving vehicle having a means for providing an XR image or a self-driving vehicle that is subjected to control/interaction in an XR image. Particularly, the self-driving vehicle 100*b* that is subjected to control/interaction in the XR image may be distinguished from the XR device 100*c* and interwork with each other.

The self-driving vehicle 100*b* having the means for providing the XR image may acquire the sensor information from the sensors including the camera and output the generated XR image based on the acquired sensor information. For example, the self-driving vehicle 100*b* may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100*b*, at least part of the XR object may be output so as to overlap the object in the screen. For example, the self-driving vehicle 100*b* may output XR objects corresponding to objects such as a lane, another vehicle, a traffic light, a traffic sign, a two-wheeled vehicle, a pedestrian, a building, and the like.

When the self-driving vehicle 100*b*, which is subjected to control/interaction in the XR image, may acquire the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the control signal input through the external device such as the XR device 100*c* or the user's interaction.

Figure 4A:
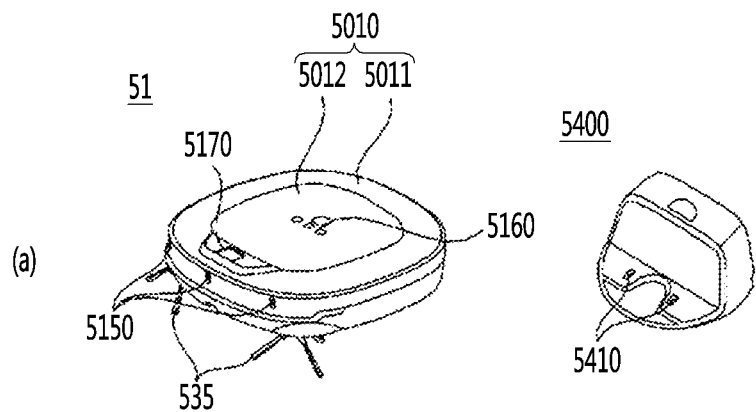
FIG. 4A is a perspective view of a robot cleaner according to an embodiment of the present disclosure.
Figure 4A:
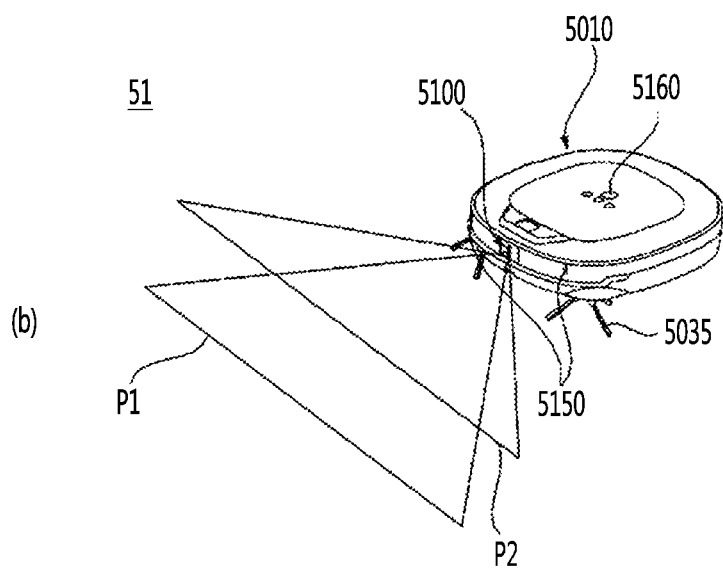
Figure 4B:
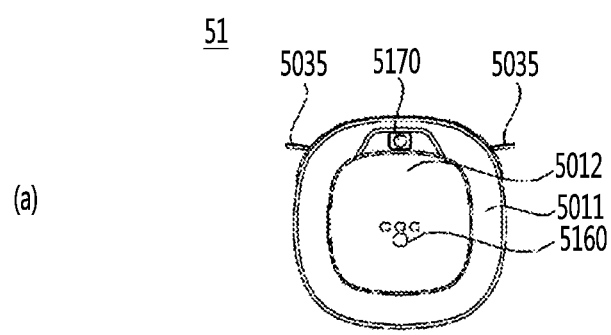
FIG. 4B illustrates a horizontal angle of view of the robot cleaner of FIG. 4A.
Figure 4B:
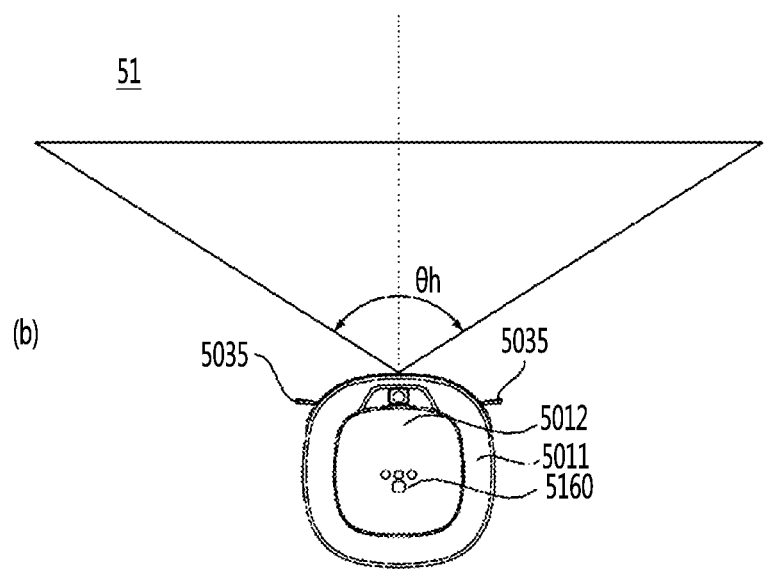
Figure 4C:
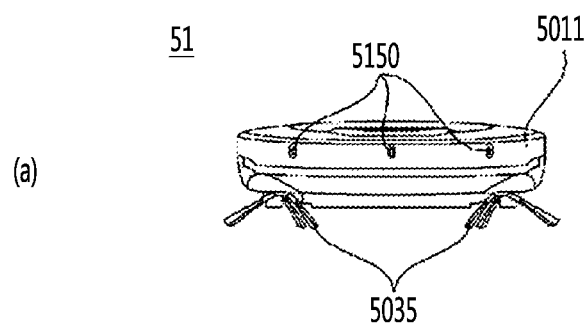
FIG. 4C is a front view of the robot cleaner of FIG. 4A.
Figure 4C:
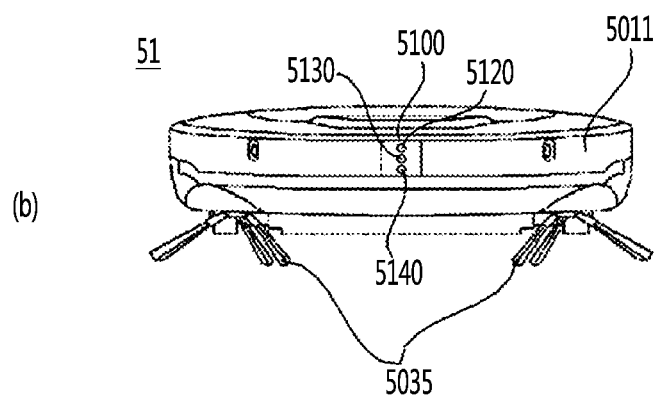
Figure 4D:
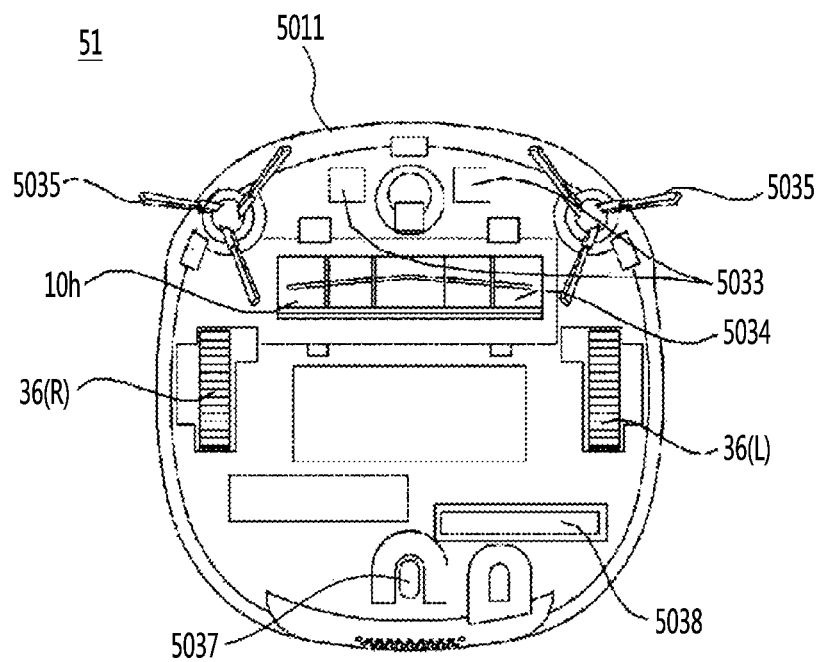
FIG. 4D illustrates the bottom of the robot cleaner of FIG. 4A.

FIG. 4A is a perspective view of a robot cleaner according to an embodiment. FIG. 4B is a horizontal viewing angle of the robot cleaner of FIG. 4A. FIG. 4C is a front view of the robot cleaner of FIG. 4A. FIG. 4D is a bottom view of the robot cleaner of FIG. 4A.

Referring to FIGS. 4A to 4D, a robot cleaner 51 according to an embodiment may include a main body 5010 suctioning foreign substances such as dusts on a floor while moving along the bottom of a cleaning area and an obstacle detector 5100 disposed on a front surface of the main body 5010.

The main body 5010 may include a casing 5011 defining an outer appearance thereof and providing a space in which components constituting the main body 5010 are accommodated therein, a suction part 5034 disposed in the casing 5011 to suction the foreign substances such as dusts or wastes, and left and right wheels 36(L) and 36(R) rotatably provided on the casing 5011. As the left and right wheels 36(L) and 36(R) rotate, the main body 10 moves along the floor of the cleaning area. In this process, the foreign substances may be suctioned through the suction part 5034.

The suction part 5034 may include a suction fan (not shown) generating a suction force and a suction hole 10*h* through which an air flow generated by rotation of the suction fan is suctioned. The suction part 5034 may include a filter (not shown) collecting the foreign substances from the air flow suctioned through the suction hole 10*h* and a collection box (not shown) in which the foreign substances collected by the filter are accumulated.

Also, the main body 5010 may include a traveling actuator that drives the left wheel 36(L) and the right wheel 36(R). The traveling actuator may include at least one driving motor. The at least one driving motor may include a left wheel driving motor rotating the left wheel 36(L) and a right wheel driving motor rotating the right wheel 36(R).

The left wheel driving motor and the right wheel driving motor may be independently controlled in operation by a traveling control part of a controller to allow the main body 5010 to travel forward or backward or rotate. For example, when the main body 5010 travels forward, the left wheel driving motor and the right wheel driving motor rotate in the same direction. On the other hand, when the left wheel driving motor and the right wheel driving motor respectively rotate at different speeds or rotate in different directions, the traveling direction of the main body 5010 may be switched. At least one auxiliary wheel 5037 may be further provided to stably support the main body 5010.

A plurality of brushes 5035 disposed on a front side of the bottom surface of the casing 5011 and including a brush constituted by a plurality of wings extending in a radial direction may be further provided. The dusts may be removed from the floor of the cleaning area by the rotation of the plurality of brushes 5035. Then, the dusts separated from the floor may be suctioned through the suction hole 10*h* and collected into the collection box.

A control panel including a manipulation part 5160 receiving various commands for controlling the robot cleaner 51 from the user may be provided on a top surface of the casing 5011.

The obstacle detector 5100 may be disposed on the front surface of the main body 5010.

The obstacle detector 5100 is fixed to the front surface of the casing 5011 and includes a first pattern irradiation part 5120, a second pattern irradiation part 5130, and an image acquisition part 5140. Here, as illustrated in the drawing, the image acquisition part may be fundamentally installed below the pattern irradiation part. In some cases, the image acquisition part may be disposed between the first and second pattern irradiation parts. Also, a second image acquisition part (not shown) may be further provided on an upper end of the main body. The second image acquisition part captures an image of the upper end of the main body, i.e., an image of a ceiling.

A rechargeable battery 5038 may be provided in the main body 5010. A charging terminal 5033 of the battery 5038 may be connected to a commercial power source (for example, a power outlet in the home), or the main body 5010 may be docked to a separate charging station (not shown) connected to the commercial power source so that the charging terminal 5033 is electrically connected to the commercial power source so as to charge the battery 5038, The electronic components constituting the robot cleaner may receive power from the battery 5038. Thus, in a state in which the battery 5038 is charged, the robot cleaner 51 may travel for oneself in a state of being electrically separated from the commercial power source.

Figure 4E:
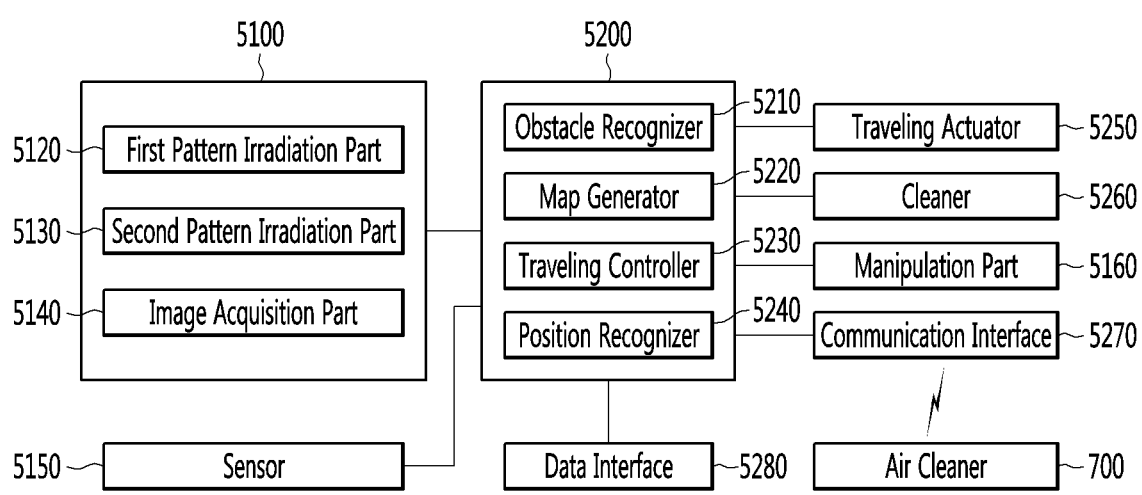
FIG. 4E is a block diagram illustrating the main parts of the robot cleaner.

FIG. 4E is a block diagram illustrating main components of the robot cleaner according to an embodiment.

As illustrated in FIG. 4E, the robot cleaner 51 includes a traveling actuator 5250, a cleaner 5260, a data interface 5280, an obstacle detector 5100, a sensor 5150, a communication interface 5270, a manipulation part 5160, and a controller 5200 controlling an overall operation of the robot cleaner 51. The controller 5200 may be implemented as one or more microprocessor or a hardware device.

The manipulation part 5160 includes at least one input interface such as a button, a switch, a touch pad, and the like to receive a user's command. As described above, the manipulation part may be disposed on the upper end of the main body 5010.

The data interface 5280 stores an obstacle detection signal inputted from the obstacle detector 5100 or the sensor 5150, reference data through an obstacle recognition part 5210 determines an obstacle, and obstacle information on the detected obstacle. Also, the data interface 5280 stores a map containing control data for controlling an operation of the robot cleaner, data according to a cleaning mode of the robot cleaner, and obstacle information generated by a map generation part. The data interface 5280 may store a base map, a cleaning map, a user map, and a guide map. The obstacle detection signal includes a detection signal such as ultrasound/laser by the sensor and an acquired image of the image acquisition part.

Also, the data interface 5280 may store data that is readable by a microprocessor and include a hard disk drive (HDD), a solid state disk (SSD), a silicon disk drive (SDD), a ROM, a RAM, a CD-ROM, a magnetic tape, a floppy disk, and an optical data storage device.

The communication interface 5270 communicates with an air cleaner in a wireless communication manner. Also, the communication interface 5270 may be connected to an Internet network through a home network to communicate with an external server or an air cleaner.

The communication interface 5270 transmits the generated map to the air cleaner and transmits data on an operation state and cleaning state of the robot cleaner to the air cleaner. The communication interface 5270 includes a communication module such as Wi-Fi and WiBro as well as short-range wireless communication such as Zigbee and Bluetooth to transmit or receive data.

The traveling actuator 5250 includes at least one driving motor to allow the robot cleaner to travel according to a control command of the traveling control part 230. As described above, the traveling actuator 5250 may include a left wheel driving motor rotating the left wheel 36(L) and a right wheel driving motor rotating the right wheel 36(R).

The cleaner 5260 operates the brush to easily suction dusts or foreign substances around the robot cleaner and operates the suction device to suction the dusts or foreign substances. The cleaner 5260 controls the operation of a suction fan provided in the suction part 34 that suctions the foreign substances such as dusts or wastes so that the dusts are introduced into a foreign substance collection box through the suction hole.

The obstacle detector 5100 includes a first pattern irradiation part 5120, a second pattern irradiation part 5130, and image acquisition part 5140.

The sensor 5150 includes a plurality of sensors to assist the detection of the obstacle. The sensor 5150 may include at least one of a laser sensor, an ultrasonic sensor, or an infrared sensor. Also, the sensor 5150 detects an obstacle in front of the main body 5010, that is, an obstacle in a traveling direction by using at least one of laser, ultrasonic waves, or infrared rays. When the transmitted signal is reflected and incident, the sensor 5150 inputs information on whether an obstacle exists or a distance up to the obstacle into the controller 5200 as an obstacle detection signal.

Also, the sensor 5150 includes at least one tilt sensor to detect a tilt of the main body. The tilt sensor calculates a tilted direction and angle when the tilt sensor is tilted in the front, rear, left and right directions. The tilt sensor may be a tilt sensor, an acceleration sensor, or the like, and in the case of the acceleration sensor, any one of a gyro type, an inertial type, and a silicon semiconductor type may be applied.

The sensor 5150 may include at least one of the components of the obstacle detector 5100 and may perform a function of the obstacle detector 5100.

In the obstacle detector 5100, the first pattern irradiation part 5120, the second pattern irradiation part 5130, and the image acquisition part 5140 are installed on the front surface of the main body 5010 as described above to emit light P1 and P2 having first and second patterns to a front side of the robot cleaner and photograph the emitted pattern light, thereby acquiring an image.

Also, the sensor 5150 may include a dust sensor that detects an amount of dusts in the air and a gas sensor that detects an amount of gas in the air.

The obstacle detector 5100 inputs the acquired image into the controller 5200 as an obstacle detection signal.

The first and second pattern irradiation parts 5120 and 5130 of the obstacle detector 5100 may include a light source and an optical pattern projection element (OPPE) that generates a predetermined pattern by transmitting light emitted from the light source. The light source may be a laser diode (LD), a light emitting diode (LED), or the like. Laser light is superior to other light sources in terms of monochromaticity, straightness, and connection characteristics, so that accurate distance measurement is possible. Particularly, since infrared or visible light has a limitation in that a large deviation occurs in the accuracy of distance measurement depending on factors such as a color and material of an object, the laser diode is preferable as the light source. The OPPE may include a lens and a diffractive optical element (DOE). Light having various patterns may be emitted according to a configuration of the OPPE provided in each of the pattern irradiation parts 5120 and 5130.

The first pattern irradiation part 5120 may irradiate light P1 having a first pattern (hereinafter, referred to as first pattern light) toward a front lower side of the main body 5010. Thus, the first pattern light P1 may be incident onto the floor of the cleaning area.

The first pattern light P1 may be configured in the form of a horizontal line Ph. The first pattern light P1 may also be configured in the form of a cross pattern in which the horizontal line Ph intersects a vertical line Pv.

The first pattern irradiation part 5120, the second pattern irradiation part 5130, and the image acquisition part 5140 may be vertically arranged in a line. The image acquisition part 5140 is disposed below the first pattern irradiation part 5120 and the second pattern irradiation part 5130, but is not limited thereto. For example, the image acquisition part 5140 may be disposed above the first pattern irradiation part and the second pattern irradiation part.

In an embodiment, the first pattern irradiation part 5120 is disposed at an upper side to emit the first pattern light P1 downward toward the front side, thereby detect an obstacle disposed below the first pattern irradiation part 5120. The second pattern irradiation part 5130 is disposed at a lower side to emit light P2 having a second pattern (hereinafter, referred to as second pattern light) upward toward the front side. Thus, the second pattern light P2 may be incident onto an obstacle or a predetermined portion of the obstacle that is disposed at a position higher than the second pattern irradiation part 5130 from a wall or the floor of the cleaning area.

The second pattern light P2 may have a pattern different from the first pattern light P1 and preferably includes a horizontal line. Here, the horizontal line does not have to be a continuous line segment, but may be provided as a dotted line.

In FIG. 2 shown above, the displayed irradiation angle θh indicates a horizontal irradiation angle of the first pattern light P1 emitted from the first pattern irradiation part 5120 and indicates an angle between each of both ends of the horizontal line Ph and the first pattern irradiation part 5120. The irradiation angle θh may be preferably determined in a range of about 130° to about 140°, but is not necessarily limited thereto. The dotted line shown in FIG. 2 is directed toward the front side of the robot cleaner 51, and the first pattern light P1 may be configured to be symmetrical with respect to the dotted line.

Like the first pattern irradiation part 5120, the second pattern irradiation part 5130 may also have a horizontal irradiation angle, preferably, in a range of about 130° to about 140°. According to an embodiment, the second pattern light P2 may be emitted at the same horizontal irradiation angle as the first pattern irradiation part 5120. In this case, the second pattern light P1 may also be configured to be symmetrical with respect to the dotted line shown in FIG. 2.

The image acquisition part 5140 may acquire an image of the front side of the main body 5010. The pattern light P1 and P2 appear on an image acquired by the image acquisition part 5140 (hereinafter, referred to as an acquired image). Hereinafter, the images of the pattern light P1 and P2 appearing on the acquired image are referred to as light pattern. This is done because the pattern light P1 and P2 incident into an actual space are substantially images formed on an image sensor, the same reference numerals as the pattern light P1 and P2 are assigned to the first and second pattern light P1 and P2, and thus, the images respectively corresponding to the first pattern light P1 and the pattern light P2 will be referred to as a first light pattern P1 and a second light pattern P2.

The image acquisition part 5140 may include a digital camera that converts an image of an object into an electrical signal and then converts the image into a digital signal and stores the image in a memory device. The digital camera may include an image sensor (not shown) and an image processor (not shown).

An image sensor is a device that converts an optical image into an electrical signal and is provided in the form of a chip in which a plurality of photo diodes are integrated. For example, a pixel may be the photo diode. Charges are accumulated in each pixel by an image formed on the chip by light passing through the lens, and the charges accumulated in the pixels are converted into electrical signals (e.g., voltages). A charge coupled device (CCD), a complementary metal oxide semiconductor (CMOS), and the like are well known as the image sensor.

The image processor generates a digital image based on an analog signal outputted from the image sensor. The image processor includes an AD converter that converts an analog signal into a digital signal, a buffer memory that temporarily records digital data according to the digital signal outputted from the AD converter, and a digital signal processor (DSP) that processes information recorded in the buffer memory to form a digital image.

The controller 5200 includes an obstacle recognition part 5210, a map generation part 5220, a traveling control part 5230, and a position recognition part 5240.

The obstacle recognition part 5210 determines an obstacle through an acquired image inputted from the obstacle detector 5100, and the traveling control part 5230 controls the traveling actuator 5250 to change a moving direction or a travel route in response to the obstacle information so as to pass through the obstacle or to avoid the obstacle.

The traveling control part 5230 controls the traveling actuator 5250 to independently control the operation of the left wheel driving motor and the right wheel driving motor so that the main body 5010 straightly moves or rotates to travel.

The obstacle recognition part 5210 stores the obstacle detection signal inputted from the sensor 5150 or the obstacle detector 5100 in the data interface 5280 and analyzes the obstacle detection signal to determine the obstacle.

The obstacle recognition part 5210 determines whether there is an obstacle in front of the sensor based on the signal of the sensor and analyzes the acquired image to determine a position, size, and shape of the obstacle.

The obstacle recognition part 5210 extracts a pattern by analyzing the acquired image. The obstacle recognition part 5210 extracts a light pattern that appears when the pattern light emitted from the first pattern irradiation part or the second pattern irradiation part is emitted onto the floor or the obstacle and determines the obstacle based on the extracted light pattern.

The obstacle recognition part 5210 detects the light patterns P1 and P2 from the image (acquired image) acquired by the image acquisition part 5140. The obstacle recognition part 5210 may detect a feature such as a point, a line, a surface, or the like with respect to predetermined pixels constituting the acquired image and detect points, lines, planes, and the like constituting the patterns P1 and P2 or the light patterns P1 and P2 based on the detected feature.

The obstacle recognition part 5210 may extract line segments formed by successive pixels that are brighter than the surroundings and extract the horizontal line Ph forming the first light pattern P1 and the horizontal line forming the second light pattern P2. Since various techniques for extracting a pattern having a desired shape from the digital image are already known, the obstacle recognition part 5210 may extract the first light pattern P1 and the second light pattern P2 by using the known techniques.

The obstacle recognition part 5210 determines whether an obstacle exists based on the detected pattern and determines a shape of the obstacle. The obstacle recognition part 5210 may determine the obstacle through the first light pattern and the second light pattern and calculate a distance up to the obstacle. The obstacle recognition part 5210 may determine a size (height) and a shape of the obstacle by changing the shapes of the first light pattern and the second light pattern and the light pattern that appears during the approach of the obstacle.

The obstacle recognition part 5210 determines the obstacle with respect to the first and second light patterns based on the distance from a reference position. When the first light pattern P1 appears at a position lower than the reference position, the obstacle recognition part 5210 may determine that a downhill slope exists and determine that a cliff exists when the first light pattern P1 disappears. When the second light pattern appears, the obstacle recognition part 5210 may determine an obstacle at the front side or an obstacle at the upper side.

The obstacle recognition part 5210 determines whether the main body is tilted based on the tilt information inputted from the tilt sensor of the sensor 5150. When the main body is tilted, the tilt is compensated for the position of the light pattern of the acquired image.

The traveling control part 5230 controls the traveling actuator 5250 to perform cleaning while traveling with respect to a designated area of the cleaning area and controls the cleaner 5260 to perform the cleaning by suctioning dusts during the traveling.

The traveling control part 5230 controls the traveling actuator 5250 by setting a travel route so that the robot cleaner travels to approach the obstacle, passes through the obstacle, or avoids the obstacle by determining whether to travel or enter in response to the obstacle recognized by the obstacle recognition part 5210.

The map generation part 5220 generates a map of the cleaning area based on the information on the obstacle determined by the obstacle recognition part 5210.

The map generation part 5220 generates a map for the cleaning area based on the obstacle information while traveling on the cleaning area when the map for an initial operation or the cleaning area is not stored. The map generation part 5220 updates the pre-generated map based on the obstacle information acquired during the traveling.

The map generation part 5220 generates a base map based on the information acquired by the obstacle recognition part 5210 during the traveling and generates a cleaning map by distinguishing an area from the base map. The map generation part 5220 generates a user map and a guide map by arranging the area with respect to the cleaning map and setting the attributes of the area.

The base map is a map in which the shape of the cleaning area required through the traveling is displayed as an outline, and the cleaning map is a map in which an area is divided within the base map. The base map and the cleaning map include information on the traveling area and obstacle information of the robot cleaner. The user map is a map that has a visual effect by simplifying an area of the cleaning map and arranging the outlines. The guide map is a superimposed map of the clean map and the user map. Since the cleaning map is displayed on the guide map, a cleaning command may be inputted based on an area in which the robot cleaner actually travels.

After generating the base map, the map generation part 5220 may divide the cleaning area into a plurality of areas, include a connection passage connecting the plurality of areas to each other, and generate a map including information on obstacles within each area. The map generation part 5220 generates a map in which the areas are divided by dividing the small areas to distinguish the areas on the map, setting the representative areas, and setting the separated small areas as separate detailed areas and merging the areas into the representative areas.

The map generation part 5220 processes a shape of the area with respect to each divided area. The map generation part 5220 sets attributes of the divided areas and processes the shapes of the areas according to the attributes for each area.

The map generation part 5220 determines the main area first in each of the divided areas based on the number of contact points with other areas. The main area is basically a living room, but in some cases, the main area may be changed to any one of a plurality of rooms. The map generation part 5220 sets attributes of the remaining area based on the main area. For example, the map generation part 5220 may set an area having a predetermined size or more arranged around the living room, which is the main area, as a room, and set other areas as other areas.

In the processing of the shape of the area, the map generation part 5220 processes each area to have a specific shape depending on a criterion according to the attributes of the area. For example, the map generation part 5220 processes the shape of the area based on a shape of a general home room, for example, a quadrangle. Also, the map generation part 5220 expands the shape of the area based on the outermost cell of the base map and processes the shape of the area by deleting or reducing the area of the area that is inaccessible due to the obstacle.

Also, in the base map, the map generation part 5220 may display an obstacle, which has a size greater than a predetermined size, on the map according to the sizes of the obstacles and delete an obstacle, which has a size less than that of the predetermined cell, so as not to display the obstacle. For example, the map generation part displays furniture on a map, such as a chair or a sofa having a predetermined size and deletes an obstacles, for example, a small toy, and the like, which appear temporarily. The map generation part 5220 stores a position of the charging station together on the map when the map is generated.

After the map is generated, the map generation part 5220 may add an obstacle on the map based on the obstacle information inputted from the obstacle recognition part 21 with respect to the detected obstacle. The map generation part 5220 adds an obstacle to the map when a specific obstacle is repeatedly detected at a fixed position and ignores the obstacle when the obstacle is temporarily detected.

The map generation part 5220 generates both the user map that is a processed map and the guide map in which the user map and the cleaning map are displayed to overlap each other.

When a virtual wall is set, the map generation part 5220 sets a position of the virtual wall on the cleaning map based on data about the virtual wall received through the communication interface and calculates coordinates of the virtual wall corresponding to the cleaning area. The map generation part 5220 registers the virtual wall as an obstacle on the cleaning map.

The map generation part 5220 stores data about the set virtual wall, for example, information about a level of the virtual wall and the attributes of the virtual wall.

The map generation part 5220 enlarges the set virtual wall and registers the virtual wall as an obstacle. During the traveling, the main body 5010 is set to a wider range by enlarging the virtual wall set so as not to contact or invade the virtual wall.

If the map generation part 5220 does not determine the current position of the main body 5010 by the position recognition part 5240, the map generation part 5220 generates a new map for the cleaning area. The map generation part 5220 may determine that the map generation part 5220 moves to a new area and initialize the preset virtual wall.

When the map generation part 5220 receives data on the virtual wall during the traveling, the map generation part 5220 further sets the virtual wall on the map to operate corresponding to the virtual wall when the main body 5010 travels. For example, when the new virtual wall is added, or the level or attribute of the virtual wall is changed, and when the position of the preset virtual wall is changed, the map generation part 5220 updates the map based on the received data. Then, the information about the changed virtual wall is reflected to the map.

The position recognition part 5240 determines the current position of the main body 5010 based on the maps (the cleaning map, the guide map, or the user map) stored in the data interface.

When the cleaning command is inputted, the position recognition part 5240 determines whether the current position of the map matches the current position of the main body, and if the current position does not match the position on the map, or if the current position is not confirmed, the current position of the robot cleaner 51 is recovered by recognizing the current position. The traveling control part 5230 controls the traveling actuator to move to the designated area based on the current position when the current position is restored. The cleaning command may be inputted from a remote controller (not shown), the manipulation part 5160, or the air cleaner.

If the current position does not match the position on the map, or the current position is not confirmed, the position recognition part 5240 analyzes the acquired image inputted from the image acquisition part 5140 to estimate the current position based on the map.

The position recognition part 5240 processes the acquired image acquired at each position while the map is generated by the map generation part 5220 to recognize the entire position of the main body in association with the map.

The position recognition part 5240 uses the acquired image of the image acquisition part 5140 to compare the acquired image with respect to each position on the map and grasps the current position of the main body, even when the position of the main body suddenly changes. Thus, the current position may be estimated and recognized.

The position recognition part 5240 analyzes various features disposed on the ceiling, such as lights, edges, corners, blobs, and ridges contained in the acquired image. The acquired image may be inputted from the image acquisition part or the second image acquisition part provided at the upper end of the main body.

The position recognition part 5240 detects a feature from each of the acquired images. Various methods of detecting features from an image are well known in the fields of computer vision technology. Several feature detectors are known that are suitable for the detection of the features. For example, the feature detector may include Canny, Sobel, Harris Stephens/Plessey, SUSAN, Shi & Tomasi, Level curve curvature, FAST, Laplacian of Gaussian, Difference of Gaussians, Determinant of Hessian, MSER, PCBR, and Gray-level blobs detectors.

The position recognition part 5240 calculates a descriptor based on each feature point. The position recognition part 5240 may convert the feature point into the descriptor by using a scale invariant feature transform (SIFT) technique for the feature detection. The descriptor may be expressed as an n-dimensional vector. The SIFT may detect an invariant feature with respect to a scale, rotation, and brightness change of a target to be photographed. Thus, even if the same area is photographed with different postures of the robot cleaner 51 (that is, rotation invariant (Rotation-invariant) feature may be detected. Of course, other various techniques (e.g., Histogram of Oriented Gradient (HOG), Haar feature, Fems, Local Binary Pattern (LBP), Modified Census Transform (MCT), and the like) may be applied.

The position recognition part 5240 classifies at least one descriptor into a plurality of groups according to a predetermined sub-classification rule for each acquired image based on descriptor information obtained through the acquired image of each position and converts each of descriptors included in the same group into a sub-representative descriptor according to the predetermined sub-representative rule. As another example, all the descriptors gathered from the acquired images on a predetermined area, such as a room, are classified into a plurality of groups according to a predetermined sub-classification rule to convert each of the descriptors included in the same group into a sub-representative descriptor according to the predetermined sub-representative rule.

The position recognition part 5240 may obtain a feature distribution of each position through the above process. Each positional feature distribution may be represented by a histogram or an n-dimensional vector. As another example, the learning module 143 may estimate an unknown current position based on the descriptor calculated from each feature point without passing through the predetermined sub-classification rule and the predetermined sub-representative rule.

In the case in which the current position of the robot cleaner 51 becomes in an unknown state due to a position leap or the like, the position recognition part 5240 may estimate the current position based on the data stored in the pre-stored descriptor or the sub-representative descriptor.

The position recognition part 5240 acquires an acquired image through the image acquisition part 5140 at the unknown current position, and then, when the various features such as the lights, the edges, the corners, and the blobs positioned on the ceiling are confirmed through the image, the features are detected from the acquired image.

The position recognizer 5240, based on at least one recognition descriptor information obtained through the acquired image of the unknown current position, position information to be compared according to a predetermined sub-conversion rule (for example, feature distribution of each position) and information that is capable of being compared with (sub-recognition feature distribution).

According to a predetermined sub-comparison rule, each position feature distribution may be compared with each recognition feature distribution to calculate each similarity. The similarity (probability) may be calculated for each position corresponding to each position, and the position at which the greatest probability is calculated may be determined as the current position.

When the map is updated by the map generation part 5220 during the traveling, the controller 5200 transmits the updated information to the air cleaner 300 through the communication interface, and thus the maps stored in the air cleaner 300 and the robot cleaner 51 are the same.

When the cleaning command is inputted, the traveling control part 5230 controls the traveling actuator to move to the designated area among the cleaning areas and operates the cleaner to perform the cleaning during the traveling.

When the cleaning command for the plurality of areas is inputted, the traveling control part 5230 moves along the areas according to whether the priority area is set or in a designated order to perform the cleaning. When a specific order is not designated, the traveling control part 5230 moves to the nearest or adjacent area based on the current position to perform the cleaning.

When the cleaning command for a certain area is inputted regardless of the area classification, the traveling control part 5230 moves to the area included in the arbitrary area to perform the cleaning.

When the virtual wall is set, the traveling control part 5230 determines the virtual wall and controls the traveling actuator based on the coordinate value inputted from the map generation part 5220.

Even if it is determined that the obstacle does not exist by the obstacle recognition part 5210, the traveling control part 5230 recognizes that the obstacle exists at the corresponding position to restrict the traveling when the virtual wall is set.

When the traveling control part 5230 changes the setting of the virtual wall during the traveling, the traveling control part 5230 classifies a traveling possible area and a non-traveling area according to the changed virtual wall setting to reset the travel route.

The traveling control part 5230 controls the traveling in response to any one of a setting 1 for the noise, a setting 2 for the travel route, a setting 3 for the avoidance, and a setting 4 for the security according to the attribute set on the virtual wall.

The traveling control part 5230 may access the virtual wall to perform the designated operation according to the attributes of the virtual wall (the travel route, the setting 2) or reduce and clean the noise generated from the main body (the noise, the setting 1), travel to avoid the virtual wall without approaching the virtual wall more than a certain distance (the avoidance, the setting 3), and photograph an image of a predetermined area based on the virtual wall (the security, the setting 4).

When the cleaning of the set designated area is completed, the controller 5200 stores the cleaning record in the data interface.

Also, the controller 5200 transmits an operation state or a cleaning state of the robot cleaner 51 to the air cleaner through the communication interface 190 at a predetermined cycle.

Based on the data received from the robot cleaner 51, the air cleaner displays the position of the robot cleaner together with a map on the screen of an executive application and also outputs information on the cleaning state.

When the information on the obstacle is added, the air cleaner may update the map based on the received data.

When the cleaning command is inputted, the robot cleaner may travel by dividing the travelable area and the traveling impossible area based on the information of the set virtual wall.

The sensor 5150 may include a camera. Also, the controller 5200 may acquire an image of the indoor space by controlling the camera to photograph the indoor space.

The sensor 5150 may include at least one of a laser sensor, an ultrasonic sensor, an infrared sensor, or a camera. In addition, the sensor 5150 may generate a map of an indoor space by using at least one of an image photographed by a laser, a ultrasonic wave, an infrared ray, or a camera.

Also, the sensor 5150 may include a temperature sensor for measuring a temperature of the indoor space, a first heat detection sensor (e.g., an infrared sensor) for detecting a body temperature of the user, and a second heat detection sensor for detecting heat information such as an operation state of a gas range or an electric range or heat generated by electronic products.

Also, the sensor 5150 may include a microphone that receives sound.

Also, the sensor 5150 may include a dust sensor that detects an amount of dusts in the air and a gas sensor that detects an amount of gas in the air.

Figure 5A:
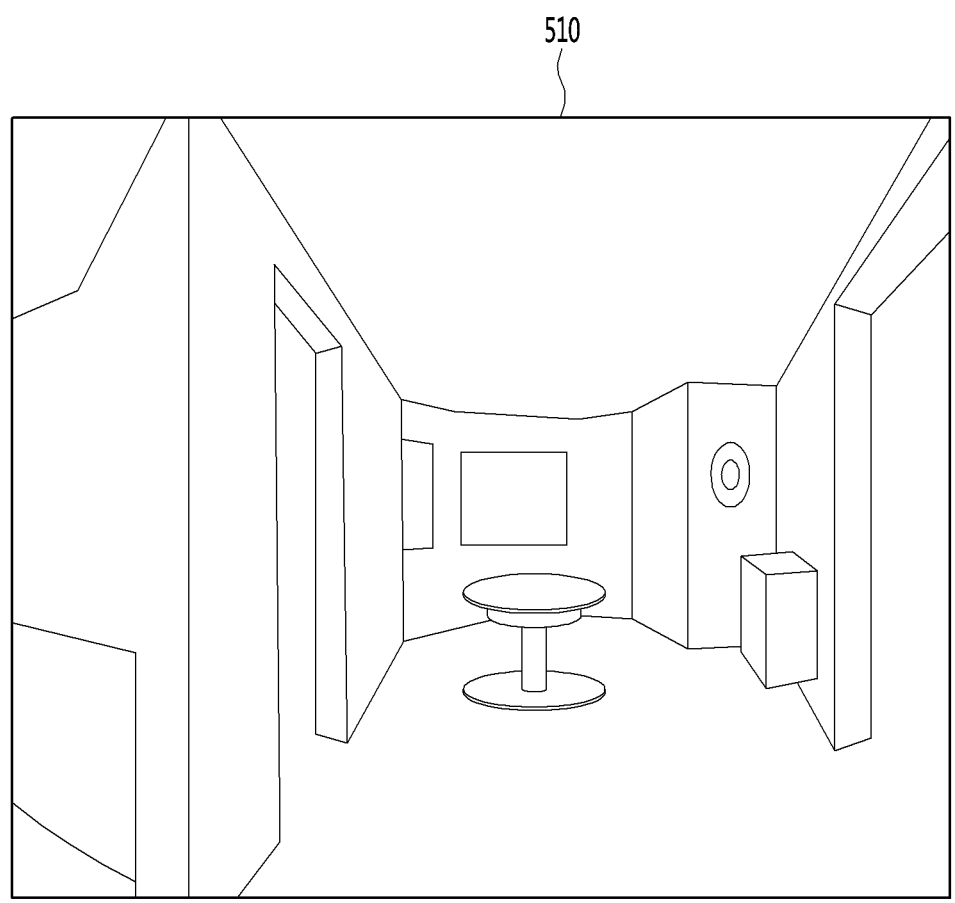
FIGS. 5A to 5C are views for describing a method of generating an indoor space map.
Figure 5B:
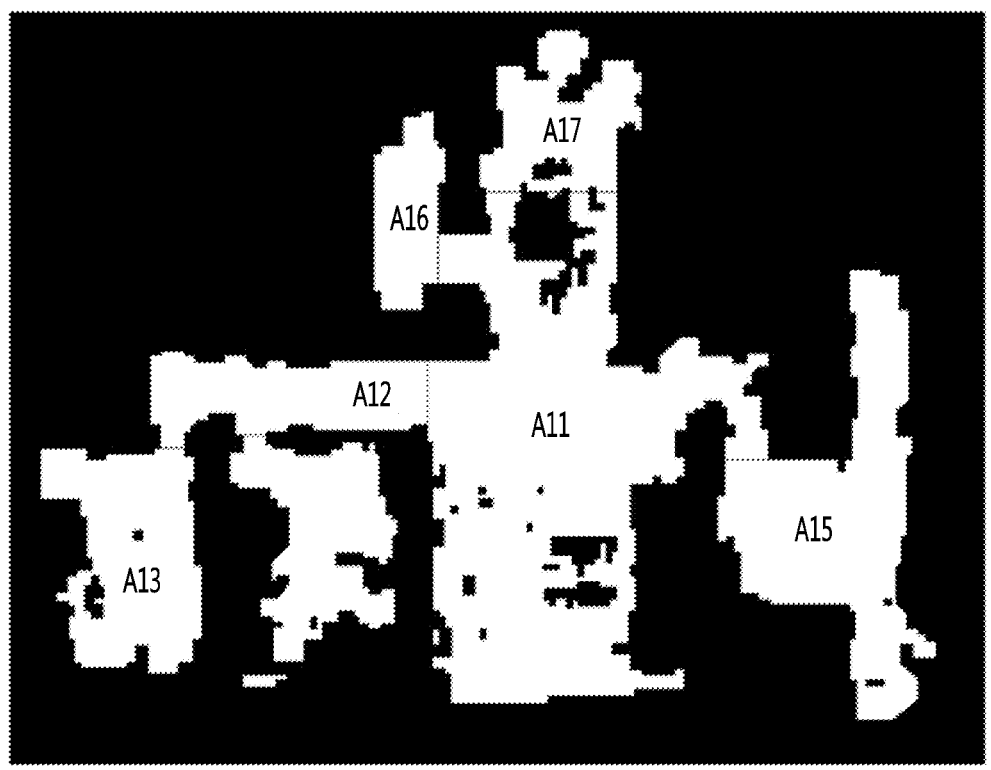
Figure 5C:

FIGS. 5A to 5C are views for explaining a method for generating the map of the indoor space according to an embodiment.

Hereinafter, the term "robot cleaner" may be used interchangeably with the term "moving agent".

The moving agent may move in the indoor space and collect information for generating a map of the indoor space.

For example, as illustrated in FIG. 5A, the moving agent may move in the indoor space and photograph a plurality of images 510 by using a camera. However, the image is only one example of information for generating the map of the indoor space, and the moving agent may collect sensing information for generating the map of the indoor space using radar, infrared rays, and ultrasonic waves.

The moving agent may acquire an image of an air conditioner disposed in the indoor space.

The moving agent may generate the map of the indoor space by using the collected information.

For example, as illustrated in FIG. 5B, the moving agent may generate a map constituted by outlines of the indoor space. In this case, the map may be divided into a plurality of zones A11 to A17, for example, a living room, a room 1, a room 2, and the like.

The moving agent may acquire an image of the air conditioner disposed in the indoor space and display a position and direction of the air conditioner on the map based on the image of the air conditioner.

The map of the indoor space may include a processed map.

Particularly, the moving agent may generate the processed map that simplifies a structure of the indoor space by using the map of the indoor space to facilitate recognition of the structure of the indoor space.

More particularly, the moving agent may simplify the shape of the area to clean up obstacles or straighten the wall.

The moving agent may display the position and direction of the air conditioner on the processed map.

The controller 200 of the moving agent may transmit feature information related to the structure of the indoor space to the air conditioner 700 through the communication interface 270. Here, the feature information may include information collected through the sensor 150 to generate the map of the indoor space, a map generated using the information collected through the sensor 150, or a processed map in which the structure of the indoor space is simplified.

The processor 780 of the air conditioner 700 may receive the feature information related to the structure of the indoor space, which is obtained by the moving agent through the communication interface 710.

When the information collected to generate the map of the indoor space is received as the feature information, the processor 780 of the air conditioner 700 uses the collected information to generate the map of the indoor space. In this case, the above-described method by which the moving agent generates the map may be used.

Hereinafter, a moving agent will be described. Meanwhile, the moving agent is described as an example of the above-described robot cleaner, but the present disclosure is not limited thereto. The moving agent may be any device (e.g., a pet robot, a guide robot, etc.) capable of moving an indoor space.

In addition, the moving agent may include the AI device 100, the learning device 200, and the robot cleaner 51, and may perform the corresponding functions.

The term "AI device 100" may be used interchangeably with the term "moving agent 100." In addition, the term "moving agent 100" may be used interchangeably with the term "AI moving agent 100."

Figure 6:
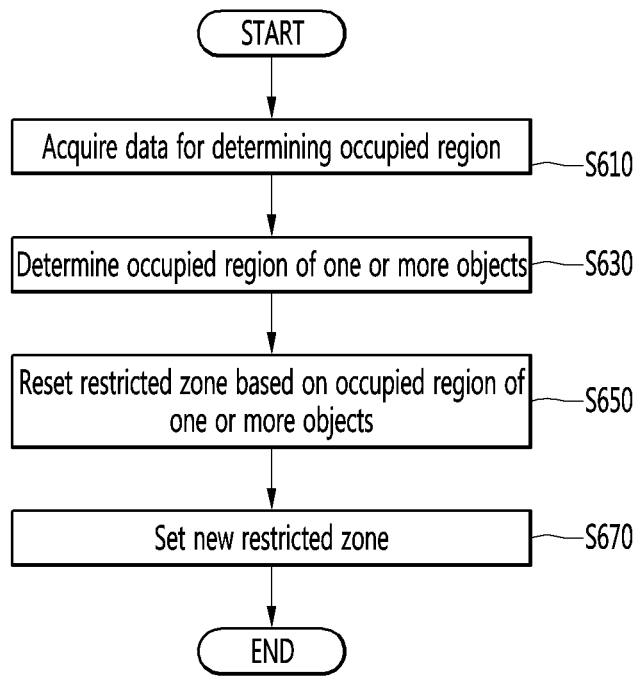
FIG. 6 is a flowchart for describing an operating method of the moving agent.

FIG. 6 is a flowchart for describing the operating method of the moving agent.

The operating method of the moving agent may include obtaining data for determining an occupied region (S610); determining occupied regions of one or more objects based on the data (S630); obtaining an adjustment zone in which a restricted zone set by a user is reset based on the occupied regions of one or more objects (S650); and setting a new restricted zone based on an occupied region of a newly detected object (S670).

Figure 7:
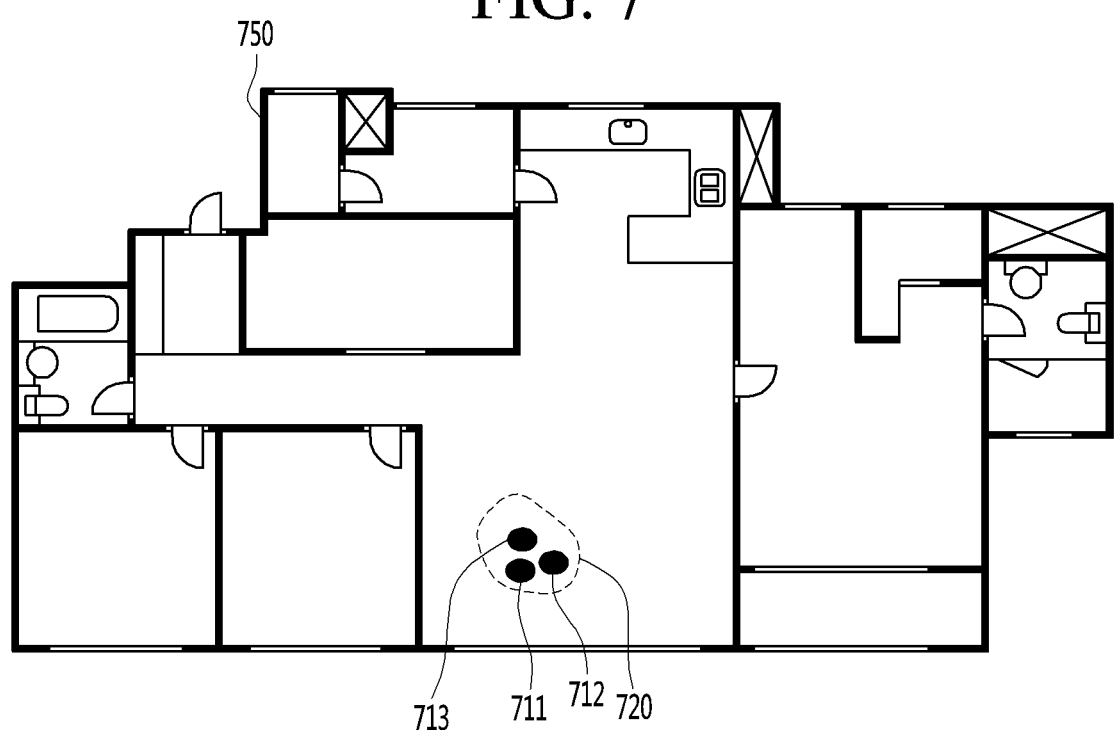
FIG. 7 illustrates a restricted zone 720 set by a user and one or more objects 711, 712, and 713.

FIG. 7 illustrates a restricted zone 720 set by a user and one or more objects 711, 712, and 713.

The restricted zone 720 may refer to a zone set by a user so as to prohibit the moving agent from entering.

In detail, the user may set a restricted zone so as to prevent the objects 711, 712, and 713 (e.g., a flower pot, a toy, a rug, etc.) and the moving agent from coming into contact with each other.

For example, if the moving agent comes into contact with the object, the object may fall, the position of the object may change, and the moving agent may be damaged. Also, if the moving agent passes the object such as the rug, the traveling of the moving agent may be stopped or the wheel of the moving agent may be damaged. Therefore, the user may set the restricted zone so as to prevent the object and moving agent from coming into contact with each other.

In this case, the user may set the restricted zone 720 surrounding the objects 711, 712, and 713.

Meanwhile, the processor 180 of the moving agent may obtain information about the restricted zone 720 set by the user.

In detail, if the user inputs the restricted zone 720 to the terminal, the processor 180 may receive information about the restricted zone 720 from the terminal via the communication interface 110.

In another embodiment, the processor 180 may receive an input of the restricted zone 720 via the input interface.

In this case, the processor 180 may store the restricted zone 720 on the indoor space map 750 in the memory.

The processor 180 may control the traveling actuator 5250 so as to prevent the moving agent from entering the restricted zone 720.

Figure 8:
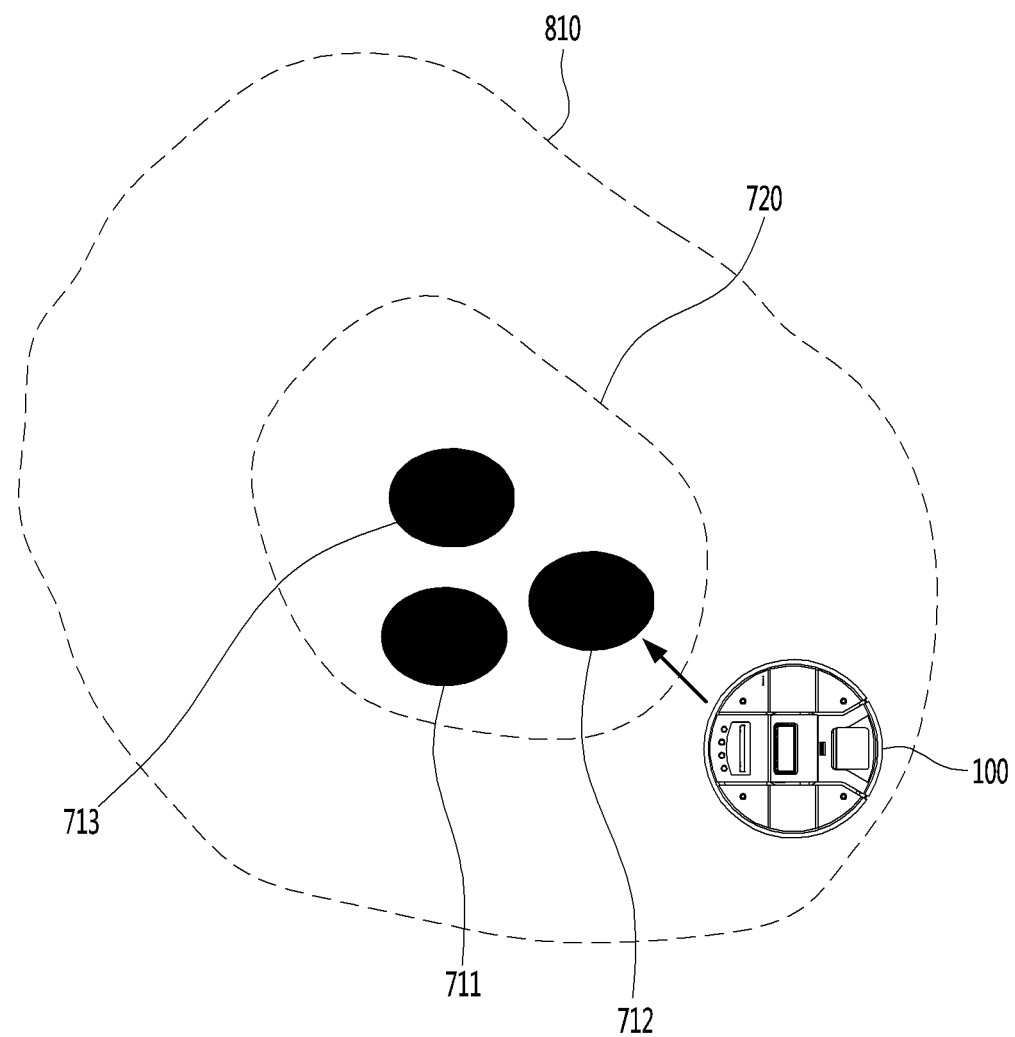
FIG. 8 is a view for describing a method of obtaining data for determining an occupied region.

FIG. 8 is a view for describing a method of obtaining data for determining an occupied region.

Figure 9:
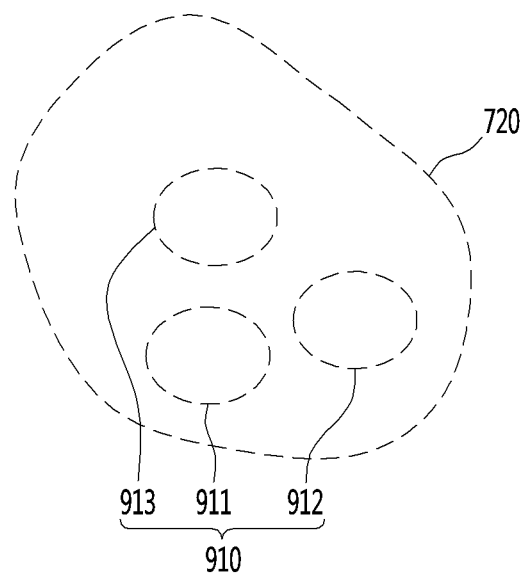
FIG. 9 is a view for describing a method of determining an occupied region.

FIG. 9 is a view for describing a method of determining an occupied region.

The sensor 140 may obtain data for determining the occupied region.

To this end, the sensor 140 may include at least one of a camera, a radar, a lidar, or an ultrasonic sensor. The data for determining the occupied region may be data collected by at least one of the camera, the radar, the lidar, or the ultrasonic sensor.

Under the control of the processor 180, the camera may capture an image.

The radar may emit an electromagnetic wave and receive an echo wave reflected from the object.

The lidar may emit a visible light and receive light reflected from the object.

The ultrasonic sensor may emit an ultrasonic wave and receive a wave reflected from the object.

Meanwhile, the processor may detect the object by using data for determining the occupied region.

In detail, the processor may detect the object in the captured image by using the image captured by the camera.

In more detail, the processor may detect the object present in the captured image by analyzing the image captured by the camera. To this end, various object recognition techniques may be used.

Meanwhile, the object may be an article that is not a background. For example, the background may be a wall, a floor, a pillar, or the like, and the object may be an article that is not a background, such as toys, flower pots, clothes, towels, belongings, and ornaments.

Meanwhile, the type of the object recognized as the object and the type of the object set as the background may be preset and stored in the memory.

In addition, the processor may detect the object in the captured image by using the AI model.

In detail, the AI model may be a neural network trained to detect the object by separating the object from the background based on deep learning. In this case, various object detection algorithms and instance segmentation algorithms may be used.

The processor may detect the object in the captured image by providing the image captured by the camera to the AI model. In detail, if the image captured by the camera is input to the AI model, the AI model may detect the object in the captured image and output the detection result.

Meanwhile, the image captured by the camera is used to detect the object, but the present disclosure is not limited thereto. The processor may detect the object by using data obtained from one or more devices of the camera, the radar, the lidar, and the ultrasonic sensor.

Meanwhile, if one or more objects 711, 712, and 713 are detected, the processor may determine the occupied regions 911, 912, 913 of one or more objects based on the data for determining the occupied region. The occupied regions 911, 912, and 913 of the objects may refer to regions occupied by the objects in the indoor space.

In detail, the processor may detect the surfaces of one or more objects by using the data collected by at least one of the camera, the radar, the lidar, or the ultrasonic sensor. The processor may determine the occupied regions 911, 912, and 913 of one or more objects 711, 712, and 713 by using the surfaces of one or more objects, the location/angle of the moving agent on the indoor space map 750, and the like, and may store the determined occupied regions 911, 912, and 913 in the memory.

Meanwhile, the processor may set a buffer region 810. The buffer region 810 may be a region that surrounds the restricted zone 720 and is larger than the restricted zone 720.

The buffer region 810 may include the restricted zone 720. In addition, that the buffer region 810 surrounds the restricted zone 720 may mean that the boundary of the buffer region 810 surrounds the restricted zone 720. In addition, that the buffer region 810 is larger than the restricted zone 720 may mean that the area of the buffer region 810 is larger than the area of the restricted zone 720.

In this case, the processor may set the buffer region 810 such that the boundary of the buffer region 810 has a predetermined distance from the boundary of the restricted zone 720.

Meanwhile, if the moving agent 100 enters the buffer region, the processor may obtain data for determining the occupied region.

In detail, the processor may control the traveling actuator such that the moving agent 100 does not enter the restricted zone 720. In addition, the processor may control the traveling actuator to move the moving agent 100 to a region outside the restricted zone 720 in the buffer region 710. In addition, if the moving agent 100 is positioned in the region outside the restricted zone 720 in the buffer region 710, the processor may control the sensor to obtain data for determining the occupied region.

If the data for determining the occupied region is obtained, the processor may use the data for determining the occupied region to detect one or more objects and determine the occupied regions of the detected one or more objects.

As described above, according to the present disclosure, the data is collected when the moving agent 100 enters the buffer region 810 surrounding the restricted zone 720, thereby solving the problem in that the moving agent must collect data in all regions of the indoor space so as to detect the object.

Meanwhile, if the moving agent enters the buffer region 810, the processor may control the traveling actuator to reduce the moving speed of the moving agent. In detail, the processor may control the traveling actuator such that the moving speed of the moving agent is less than a predetermined value.

In addition, if the moving agent is a robot cleaner, the processor may control the cleaner to stop the removal of the contaminants or reduce the strength of the removal of the contaminants.

For example, the processor may reduce the operating speed of the brush and suction fan, or stop the operation of the brush and suction fan.

If the object is a light substance such as a powder or a paper, it may be affected (scattered or moved) by the operation of the moving agent.

According to the present disclosure, if the moving agent 100 enters the buffer region 810 surrounding the restricted zone 720. the moving speed of the moving agent is reduced and the operation of the cleaner is weakened, thereby preventing the operation of the moving agent from affecting the object.

Meanwhile, the processor may determine whether to reset the restricted zone by comparing the restricted zone 720 set by the user with occupied regions 911, 912, and 913 of one or more objects. This will be described in detail with reference to FIGS. 10 to 12.

Figure 10:
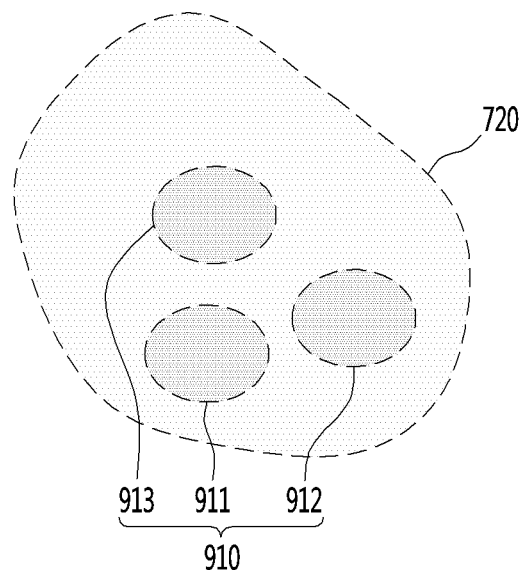
FIGS. 10 to 12 are views for describing a method of determining whether to reset a restricted zone.
Figure 11:
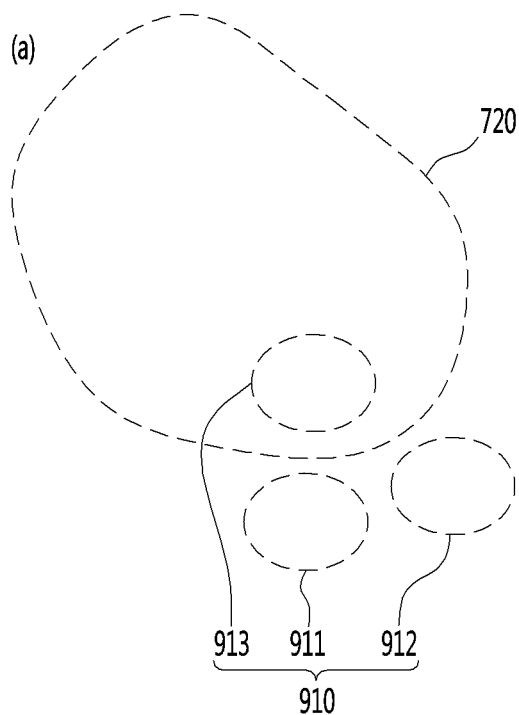
Figure 11:
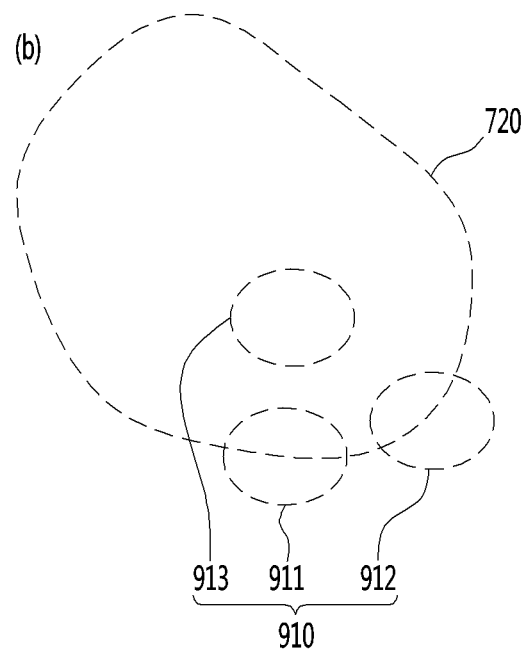
Figure 11:
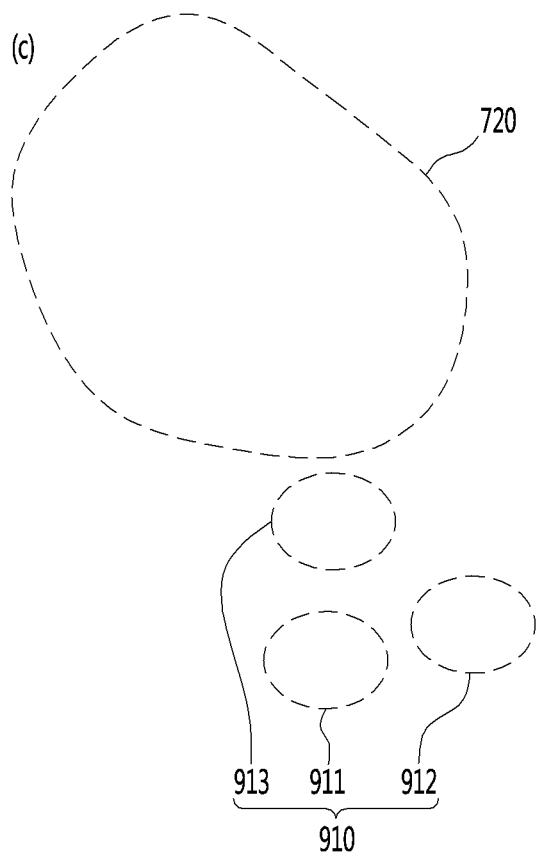
Figure 12:
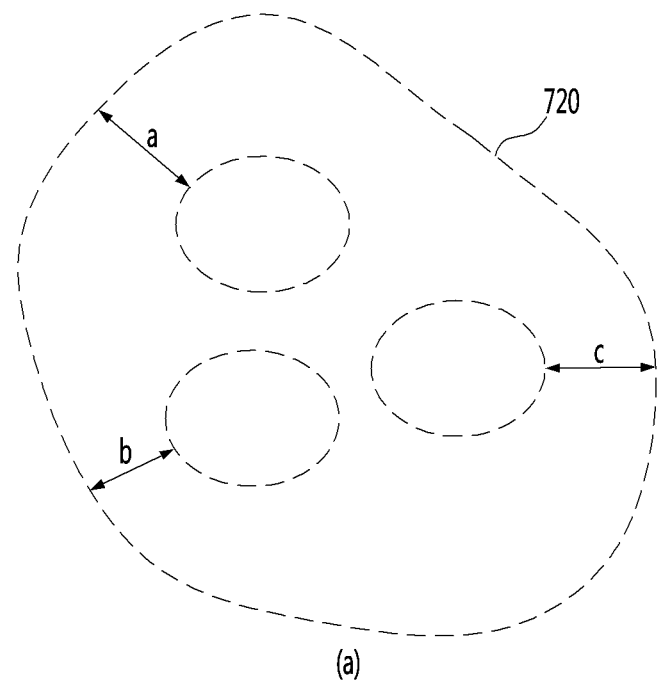
Figure 12:
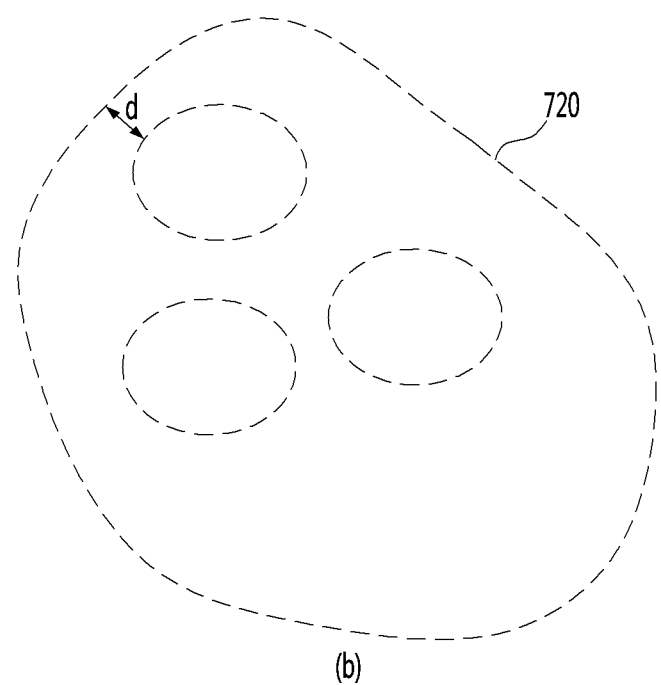

FIGS. 10 to 12 are views for describing a method of determining whether to reset a restricted zone.

Referring to FIG. 10, if the number of objects in the restricted zone is plural, the occupied region 910 of the plurality of objects 711, 712, and 713 may include a plurality of detailed occupied regions 911, 912, and 913 corresponding to the plurality of objects 711, 712, 713, respectively.

The processor may calculate the area of the restricted zone 720 set by the user and the area of the occupied region 910 of one or more objects. A Monte Carlo method may be used to calculate the area, but the present disclosure is not limited thereto. Various algorithms for calculating the area may be used.

Then, the processor may determine whether to reset the restricted zone by using the area of the restricted zone 720 set by the user and the area of the occupied region 910 of one or more objects.

In detail, if the ratio of the area of the occupied region 910 of one or more objects to the area of the restricted zone 720 set by the user is less than a first predetermined value, the processor may determine to reset the restricted zone.

For example, it is assumed that the first predetermined value is 0.5 (50%). If the area of the restricted zone 720 set by the user is 100 and the area of the occupied region 910 of one or more objects is 30, the ratio of the area of the occupied region 910 of one or more objects to the area of the restricted zone 720 set by the user is 0.3 (30%), which is less than the first predetermined value. In this case, the processor may determine to reset the restricted zone.

On the contrary, if the ratio of the area of the occupied region 910 of one or more objects to the area of the restricted zone 720 set by the user is greater than the first predetermined value (or greater than or equal to the first predetermined value), the processor may determine to maintain the restricted zone set by the user.

That the ratio of the area of the occupied region 910 of one or more objects to the area of the restricted zone 720 set by the user is less than the first predetermined value may mean that the restricted zone 720 is set to be excessively wide. Therefore, according to the present disclosure, if the ratio of the area of the occupied region of one or more objects 910 to the area of the restricted zone 720 set by the user is less than the first predetermined value, the restricted zone is reset, thereby preventing the moving region of the moving agent (moving and cleaning region in the case of the robot cleaner) from being unnecessarily restricted.

Referring to FIGS. 11A and 11B, if all or part of the occupied region 910 of one or more objects are not positioned in the restricted zone 720 set by the user, the processor may determine to reset the restricted zone 720.

In detail, referring to FIGS. 11A and 11B, a part of the occupied region 910 is not positioned in the restricted zone 720 set by the user.

In addition, referring to FIG. 11C, all of the occupied region 910 are not positioned in the restricted zone 720 set by the user.

If all or part of the occupied region 910 of one or more objects are not positioned in the restricted zone 720 set by the user, the processor may determine to reset the restricted zone 720.

If all or part of the occupied region 910 of one or more objects are not positioned in the restricted zone 720 set by the user, the moving agent may collide with the objects. According to the present disclosure, if all or part of the occupied region 910 of one or more objects are not positioned in the restricted zone 720 set by the user, the restricted zone is reset, thereby preventing the moving agent from colliding with the objects.

Meanwhile, referring to FIG. 12, the processor may determine whether to reset the restricted zone based on the distance between the boundary of the restricted zone set by the user and the boundary of the occupied region of one or more objects.

The distance between the boundary of the restricted zone set by the user and the boundary of the occupied region of one or more objects may mean a distance between one point of the boundary of the restricted zone and one point of the occupied region closest to the one point.

As illustrated in FIG. 12A, if the boundary of the restricted zone 720 set by the user is greater than the boundary of the occupied region of one or more objects by a first predetermined distance or more, the processor may determine to maintain the restricted zone 720 set by the user.

In detail, the processor may determine whether a distance "a" between a (1-1) point of the restricted zone 720 and a (1-2) point of the occupied region closest to the (1-1) point is greater than or equal to a first predetermined distance, may determine whether a distance "b" between a (2-1) point of the restricted zone 720 and a (2-2) point of the occupied region closest to the (2-1) point is greater than or equal to the first predetermined distance, and may determine whether a distance "c" between a (3-1) point of the restricted zone 720 and a (3-2) point of the occupied region closest to the (3-1) point is greater than or equal to the first predetermined distance.

If all of the distances a, b, and c are greater than or equal to the first predetermined distance, the processor may determine to maintain the restricted zone 720 set by the user.

Meanwhile, as illustrated in FIG. 12B, if the boundary of the restricted zone 720 set by the user and the boundary of the occupied region of one or more objects are within the first predetermined distance, the processor may determine to reset the restricted zone 720 set by the user.

In detail, if a distance d between one point of the boundary of the restricted zone 720 and one point of the occupied region closest to the one point is within the first predetermined distance, the processor may determine to reset the restricted zone 720 set by the user.

If the distance between the object and the moving region of the moving agent is too close, there is a risk that the moving agent will collide with the object due to malfunction, and if the object is a light substance such as a powder or a paper, it may be affected (scattered or moved) by the operation of the moving agent. Therefore, according to the present disclosure, if the boundary of the restricted zone set by the user and the boundary of the occupied region of one or more objects are within a predetermined distance, and if all or part of the occupied region 910 of one or more objects are not positioned within the restricted zone 720 set by the user, the restricted zone is rest, thereby preventing the moving agent from affecting the objects.

Meanwhile, if it is determined to reset the restricted zone, the processor may obtain an adjustment zone in which the restricted zone set by the user is reset based on the occupied region of one or more objects.

In detail, the processor may obtain an adjustment zone that is larger than the occupied region and surrounds the occupied region of one or more objects based on the occupied region of one or more objects.

That the adjustment zone surrounds the occupied region may mean that the boundary of the adjustment zone surrounds the occupied region. In addition, that the adjustment zone is larger than the occupied region may mean that the area of the adjustment zone is larger than the area of the occupied region. In addition, the adjustment zone may include the occupied region of one or more objects.

This will be described in detail with reference to FIGS. 13 to 15.

Figure 13:
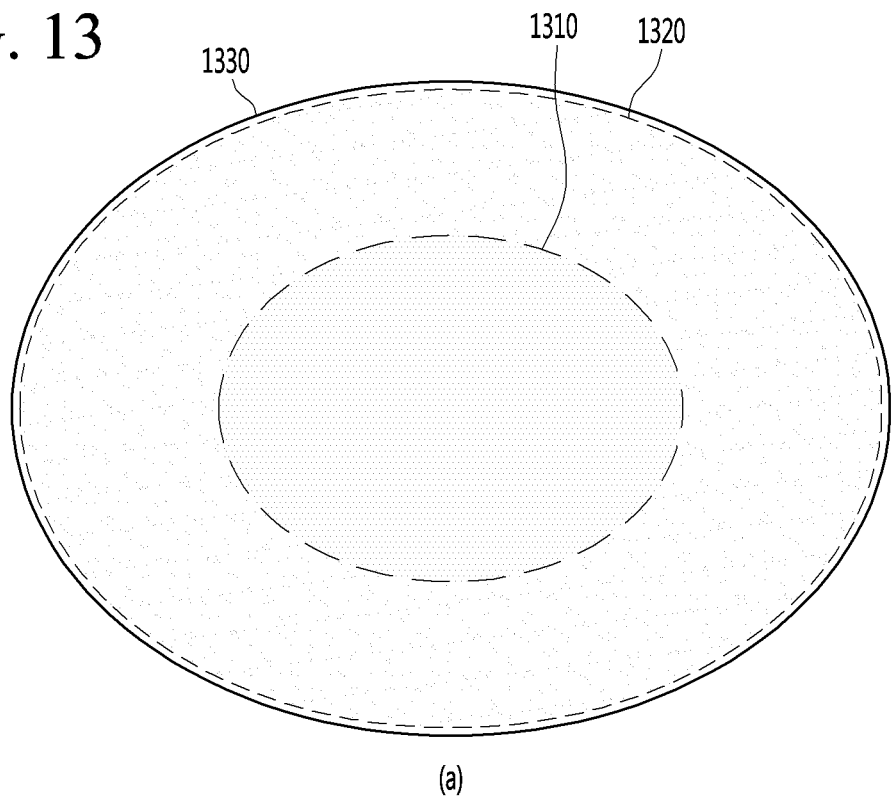
FIG. 13 is a view for describing an operation if one object is present within the restricted zone.
Figure 13:
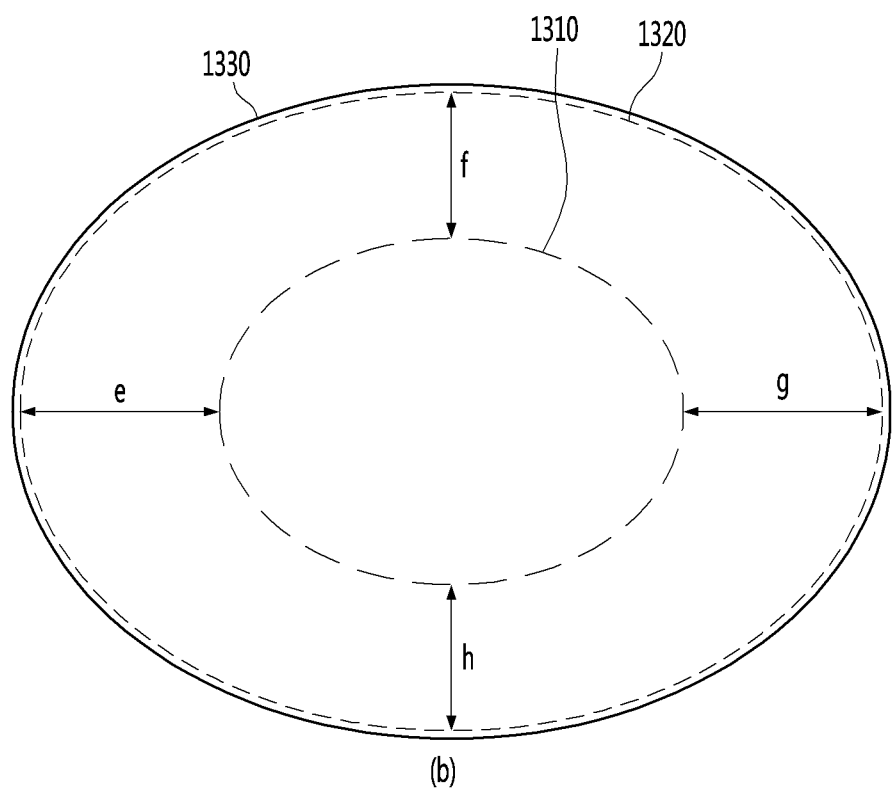

FIG. 13 is a view for describing an operation if one object is present within the restricted zone.

Referring to FIG. 13A, if only one object is present in the restricted zone set by the user, the processor may obtain a margin region 1320, which surrounds an occupied region 1310 of one object and is larger than the occupied region, as an adjustment zone 1330 based on the occupied region 1310 of one object. That is, if only one object is present in the restricted region set by the user, the margin region 1320 and the adjustment zone 1330 may coincide with each other.

In detail, the processor may obtain the margin region 1320 which surrounds the occupied region 1310 of one object and is larger than the occupied region.

That the margin region 1320 surrounds the occupied region 1310 may mean that the boundary of the margin region 1320 surrounds the occupied region 1310. In addition, that the margin region 1320 is larger than the occupied region 1310 may mean that the area of the margin region 1320 is larger than the area of the occupied region 1310. In addition, the margin region 1320 may include the occupied region 1310.

That is, according to the present disclosure, the adjustment zone which surrounds the occupied region of one or more objects and is larger than the occupied region is set. That is, according to the present disclosure, since all the occupied region of one or more objects is positioned in the adjustment zone, the moving agent may be prevented from colliding with the objects.

Meanwhile, the ratio of the area of the occupied region of one or more objects to the area of the adjustment zone 1330 may be greater than a second predetermined value.

In detail, if only one object is present in the restricted zone set by the user, the margin region 1320 and the adjustment zone 1330 coincide with each other, Therefore, the ratio of the area of the occupied region 1310 of one object to the area of the margin region 1320 may be greater than the second predetermined value.

For example, it is assumed that the second predetermined value is 0.7 (70%). If the area of the occupied region 1310 of one object is 70, the processor may set the margin region 1320 such that the area of the margin region 1320 is less than 100.

Therefore, the ratio of the area of the occupied region 1310 of one or more objects to the area of the adjustment zone 1330 may be greater than 0.7 (70%).

Meanwhile, in FIG. 10, it has been described that the restricted zone is reset if the ratio of the area of the occupied region of one or more objects to the area of the restricted zone 720 set by the user is less than the first predetermined value.

In FIG. 13A, it has been described that the ratio of the area of the occupied region of one or more objects to the area of the adjustment zone 1330 may be greater than the second predetermined value.

The second predetermined value may be greater than or equal to the first predetermined value.

For example, it is assumed that the first predetermined value is 0.5 (50%) and the second predetermined value is 0.7 (70%). In addition, it is assumed that the ratio of the area of the occupied region of one or more objects to the area of the restricted zone 720 set by the user is 0.4 (40%).

Since the ratio (0.4 (40%)) of the area of the occupied region of one or more objects to the area of the restricted zone 720 set by the user is less than the first predetermined value (0.5 (50%)), the processor may obtain the adjustment zone by resetting the restricted zone.

In addition, the adjustment zone may be set such that the ratio of the area of the occupied region of one or more objects to the area of the adjustment zone is greater than or equal to the second predetermined value (0.7 (70%)).

That is, since the area of the occupied region is the same, it can be seen that the area of the adjustment zone is smaller than the area of the restricted zone set by the user.

That is, according to the present disclosure, if the ratio of the area of the occupied region of one or more objects to the area of the restricted zone set by the user is smaller than a predetermined value, the restricted zone smaller than the restricted zone is reset, thereby preventing the moving region of the moving agent (moving and cleaning region in the case of the robot cleaner) from being unnecessarily restricted.

Referring to FIG. 13B, if only one object is present in the restricted zone set by the user, the processor may obtain a margin region 1320, which surrounds an occupied region 1310 of one object and is larger than the occupied region, as an adjustment zone 1330 based on the occupied region 1310 of one object.

In this case, a distance between the boundary of the occupied region 1310 and the boundary of the adjustment zone 1330 may be greater than a second predetermined distance.

In detail, if only one object is present in the restricted zone set by the user, the margin region 1320 and the adjustment zone 1330 coincide with each other, Therefore, the distance between the boundary of the occupied region 1310 and the boundary of the margin region 1320 may be greater than the second predetermined distance.

In more detail, the processor may set the margin region 1320 such that the distance between one point of the boundary of the occupied region 1310 and one point of the corresponding margin region 1320 is greater than the second predetermined distance.

In this case, the processor may set the margin region 1320 such that the distances e, f, g, and h between all points of the boundary of the occupied region 1310 and the point of the corresponding margin region 1320 are greater than the second predetermined distance.

For example, the distance f between a (1-1) point of the boundary of the occupied region 1310 and a (1-2) point of the margin region 1320 closest to the (1-1) point, the distance g between a (2-1) point of the boundary of the occupied region 1310 and a (2-2) point of the margin region 1320 closest to the (2-1) point, the distance h between a (3-1) point of the boundary of the occupied region 1310 and a (3-2) point of the margin region 1320 closest to the (3-1) point, and the distance e between a (4-1) point of the boundary of the occupied region 1310 and a (4-2) point of the margin region 1320 closest to the (4-1) point may be all greater than the second predetermined distance.

Meanwhile, in FIG. 12, it has been described that the restricted zone 720 set by the user is reset if the boundary of the restricted zone 720 set by the user and the boundary of the occupied region of one or more objects are within the first predetermined distance.

In FIG. 13B, it has been described that the margin region 1320 is set such that the distance between one point of the boundary of the occupied region 1310 and one point of the corresponding margin region 1320 is greater than the second predetermined distance.

The second predetermined distance may be greater than or equal to the first predetermined distance.

For example, it is assumed that the first predetermined distance is 3 and the second predetermined distance is 4. It is assumed that the arbitrary distance between the restricted zone 720 set by the user and the occupied region is 2.

Since the distance between the boundary of the restricted zone 720 set by the user and the boundary of the occupied region of one or more objects is within the first predetermined distance (3), the processor may obtain the adjustment zone by resetting the restricted zone.

In addition, the adjustment zone may be set such that the distance between the boundary of the adjustment zone and the boundary of the occupied region is greater than 4.

That is, according to the present disclosure, if the boundary of the restricted zone set by the user is too close to the object, the adjustment zone may be obtained by resetting the restricted zone. In this case, the distance between the boundary of the adjustment zone and the object may be farther than before. Therefore, according to the present disclosure, there is an advantage that the operation of the moving agent can be prevented from effecting the object.

Meanwhile, the processor may obtain the adjustment zone, which surrounds the occupied region of the one or more objects and is larger than the occupied region, based on the occupied region of one or more objects. In this case, the ratio of the area of the occupied region one or more objects to the area of the adjustment zone may be greater than the second predetermined value, and the distance between the boundary of the occupied region of one or more objects and the boundary of the adjustment zone may be greater than the second predetermined distance.

Figure 14:
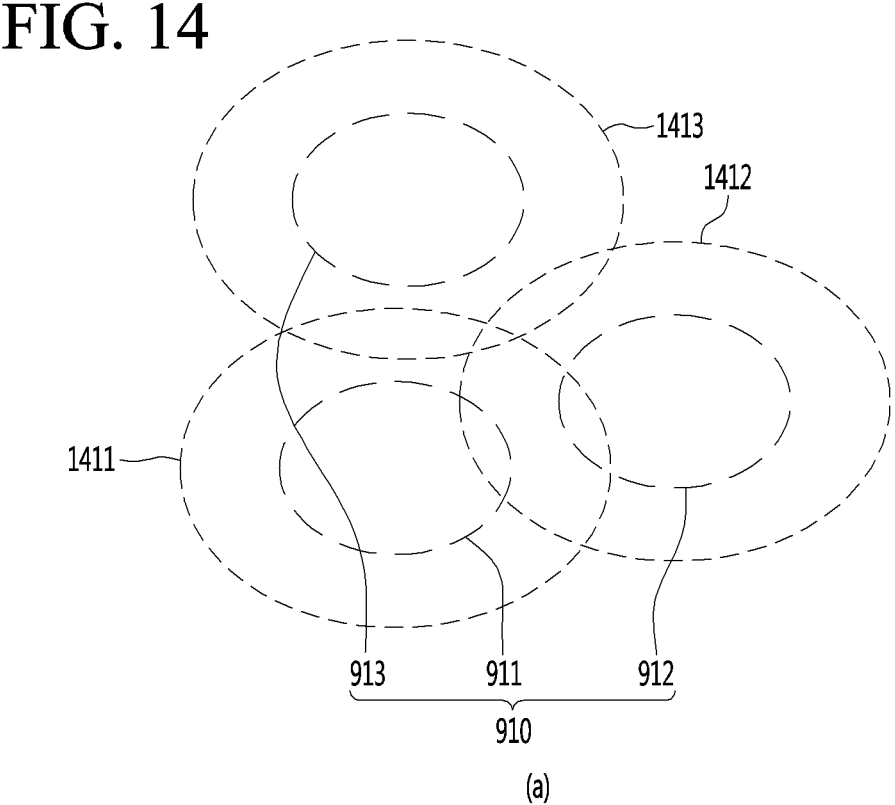
FIG. 14 is a view for describing an operation if a plurality of objects are present within the restricted zone.
Figure 14:
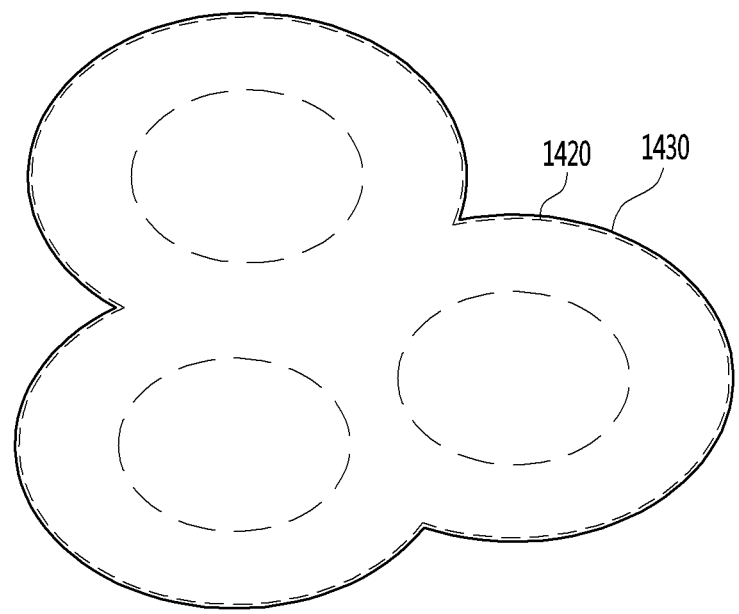

FIG. 14 is a view for describing an operation if a plurality of objects are present within the restricted zone.

The occupied region 910 of the plurality of objects may include a plurality of detailed occupied regions 911, 912, and 913 respectively corresponding to the plurality of objects.

The processor may obtain an adjustment zone 1430, which surrounds the occupied region 910 of the plurality of objects and is larger than the occupied region, based on the occupied region 910 of the plurality of objects.

In detail, the processor may set a plurality of detailed margin regions 1411, 1412, and 1413 respectively corresponding to the plurality of detailed occupied regions 911, 912, and 913.

The method of setting the margin region as described with reference to FIG. 13 may be applied to a method of setting the first detailed margin region 1411 for the first detailed occupied region 911, a method of setting the second detailed margin region 1412 for the second detailed occupied region 912, and a method of setting the third detailed margin region 1413 for the third detailed occupied region 913.

Meanwhile, the processor may set the adjustment zone 1430 including the plurality of detailed margin regions 1411, 1412, and 1413 respectively corresponding to the plurality of detailed occupied regions 911, 912, and 913.

The adjustment zone 1430 may be a region 1420 obtained by connecting the plurality of detailed margin regions 911, 912, and 913. That is, the processor may obtain the region 1420 as the adjustment zone 1430 by connecting the plurality of detailed margin regions 911, 912, and 913.

The first detailed margin region 1411 surrounds the first detailed occupied region 911 and is larger than the first detailed occupied region 911. In addition, the second detailed margin region 1412 surrounds the second detailed occupied region 912 and is larger than the second detailed occupied region 912. In addition, the third detailed margin region 1413 surrounds the third detailed occupied region 913 and is larger than the third detailed occupied region 913.

Therefore, the adjustment zone 1430 obtained by connecting the plurality of detailed margin regions 911, 912, and 913 may surround the occupied region 910 and may be larger than the occupied region 910.

That is, according to the present disclosure, the adjustment zone 1430 which surrounds the occupied region 910 of the plurality of objects and is larger than the occupied region 910 is set. That is, according to the present disclosure, since all of the occupied regions 910 of the plurality of objects are positioned in the adjustment zone, it is possible to prevent collision between the moving agent and the object.

Meanwhile, the ratio of the area of the occupied region 910 of the plurality of objects to the area of the adjustment zone 1330 may be greater than the second predetermined value. That is, the processor may set a plurality of detailed margin regions 1411, 1412, and 1413 respectively corresponding to the plurality of detailed occupied regions 911, 912, and 913 such that the ratio of the area of the occupied region 910 of the plurality of objects to the area of the adjustment zone 1330 is greater than the second predetermined value.

Meanwhile, in FIG. 10, it has been described that the restricted zone is reset if the ratio of the area of the occupied region of the plurality of objects to the area of the restricted zone 720 set by the user is less than the first predetermined value. In FIG. 14, it has been described that the ratio of the area of the occupied region of the plurality of objects to the area of the adjustment zone 1430 may be greater than the second predetermined value. In this case, the second predetermined value may be greater than or equal to the first predetermined value.

That is, according to the present disclosure, if the ratio of the area of the occupied region of the plurality of objects to the area of the restricted zone set by the user is less than a predetermined value, the restricted zone smaller than the restricted zone is reset, thereby preventing the moving region of the moving agent (moving and cleaning region in the case of the robot cleaner) from being unnecessarily restricted.

Meanwhile, the distance between the boundary of the adjustment zone 1430 and the occupied region 910 may be greater than a second predetermined distance. That is, the processor may set the plurality of detailed margin regions 1411, 1412, and 1413 respectively corresponding to the plurality of detailed occupied regions 911, 912, and 913 such that the distance between the boundary of the adjustment zone 1430 and the occupied region 910 is greater than the second predetermined value.

Meanwhile, in FIG. 12, it has been described that the restricted zone 720 set by the user is reset if the boundary of the restricted zone 720 set by the user and the boundary of the occupied region of the plurality of objects are within the first predetermined distance.

In this case, the second predetermined distance may be greater than or equal to the first predetermined distance.

That is, according to the present disclosure, if the boundary of the restricted zone set by the user is too close to the object, the adjustment zone may be obtained by resetting the restricted zone. In this case, the distance between the boundary of the adjustment zone and the object may be farther than before. Therefore, according to the present disclosure, there is an advantage that the operation of the moving agent can be prevented from affecting the object.

Meanwhile, the processor may set the plurality of detailed margin regions 1411, 1412, and 1413 respectively corresponding to the plurality of detailed occupied regions 911, 912, and 913 such that the ratio of the area of the occupied region 910 of the plurality of objects to the area of the adjustment zone 1330 is greater than the second predetermined value and the distance between the boundary of the adjustment zone 1430 and the occupied region 910 is greater than the second predetermined distance.

Figure 15:
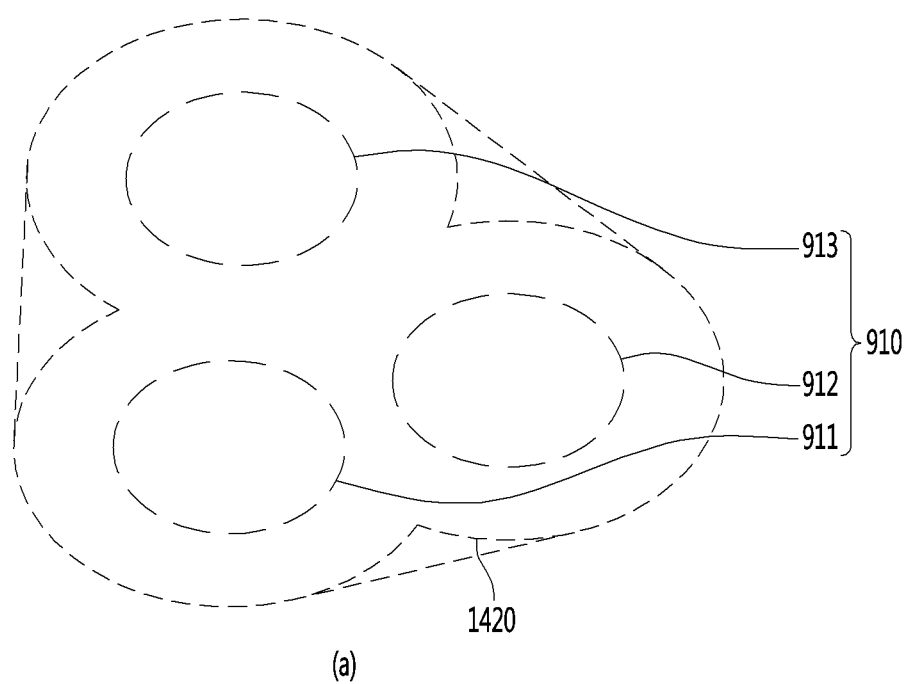
FIG. 15 is a view for describing another operation if a plurality of objects are present within the restricted zone.
Figure 15:
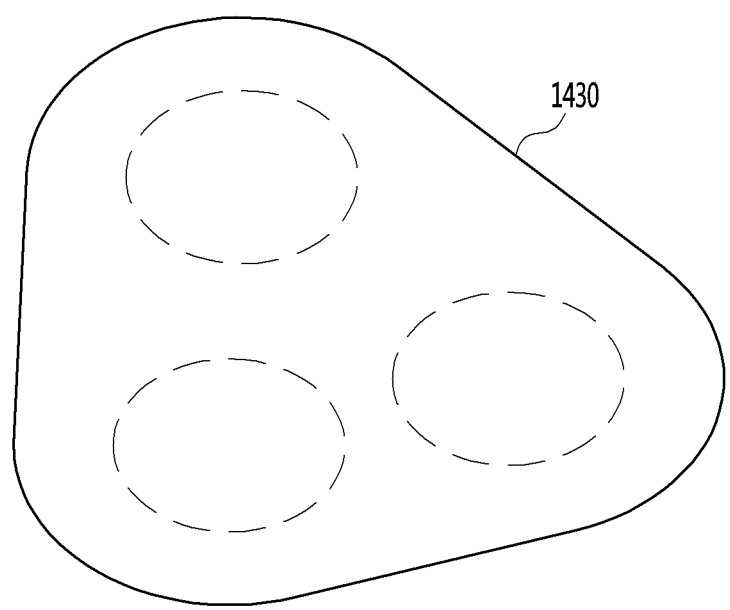

FIG. 15 is a view for describing another operation if a plurality of objects are present within the restricted zone.

The occupied region 910 of the plurality of objects may include a plurality of detailed occupied regions 911, 912, and 913 respectively corresponding to the plurality of objects.

The processor may set the plurality of detailed margin regions respectively corresponding to the plurality of detailed occupied regions 911, 912, and 913.

In addition, the processor may obtain the region 1420 by connecting the plurality of detailed margin regions 911, 912, and 913.

Meanwhile, the processor may adjust the boundary of the region 1420 obtained by connecting the plurality of detailed margin regions 911, 912, and 913 and obtain the region whose boundary is adjusted as the adjustment zone 1430.

For example, the processor may adjust the boundary of the region 1420 so as to be smoothly connected by changing a portion of the boundary of the region 1420 from a curve to a straight line, changing an angle of an arc, changing from a straight light to a curve, or changing an angle of the two sides.

Meanwhile, in this case, the adjustment zone 1430 may surround the occupied region 910 of the object and may be larger than the occupied region 910. In addition, the ratio of the area of the occupied region 910 of the object to the area of the adjustment zone 1430 may be greater than the second predetermined value, and the distance between the boundary of the plurality of occupied regions 910 and the boundary of the adjustment zone 1430 may be greater than the second predetermined distance.

Therefore, according to the present disclosure, the moving agent can move more smoothly (without sudden movement) near the adjustment zone 1430.

Figure 16:
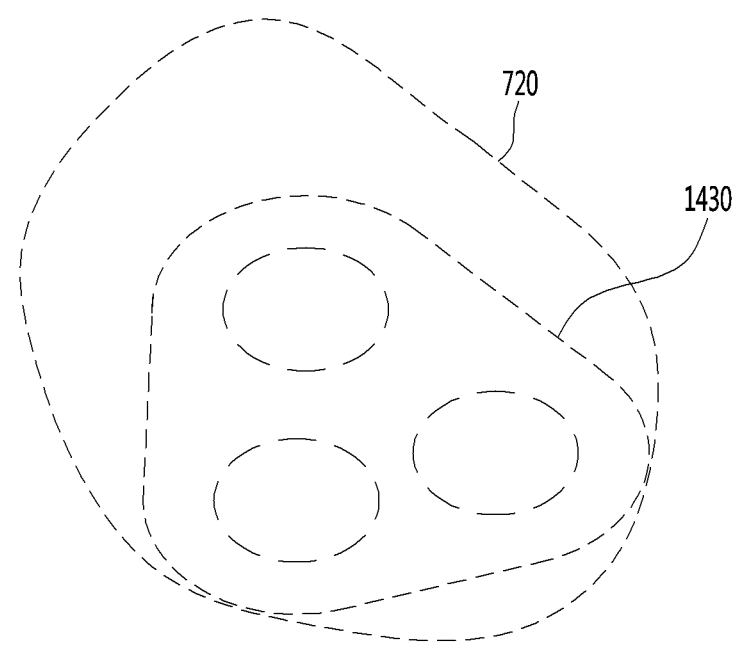
FIG. 16 is a view for describing effects of the present disclosure.

FIG. 16 is a view for describing effects of the present disclosure.

According to the present disclosure, the area 1730 of the adjustment zone may be set to be smaller than the area of the restricted zone 720 set by the user. Therefore, according to the present disclosure, it is possible to prevent the moving region of the moving agent from being unnecessarily restricted.

Figure 17:
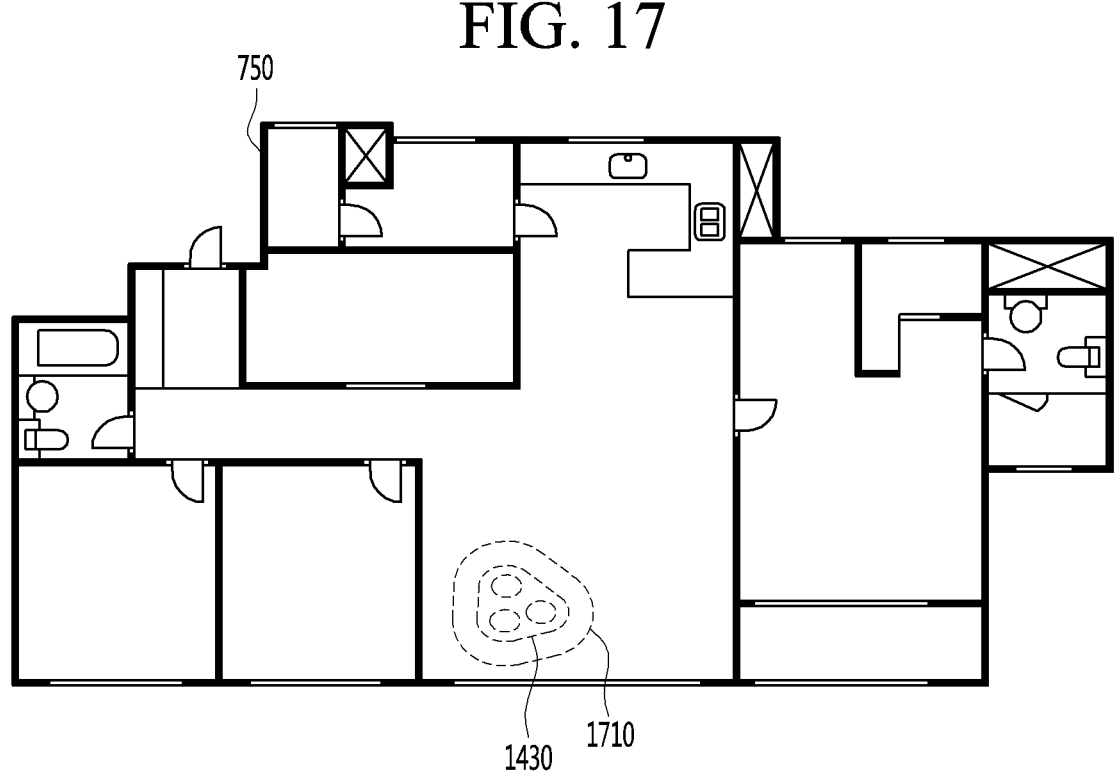
FIG. 17 is a view for describing an adjustment buffer region.

FIG. 17 is a view for describing an adjustment buffer region.

The processor may set the adjustment buffer region 1710. The adjustment buffer region 1710 may include the adjustment zone 1430. In addition, the adjustment buffer region 1710 may be a region that surrounds the adjustment zone 1430 and is larger than the adjustment zone 1430.

That the adjustment buffer region 1710 surrounds the adjustment zone 1430 may mean that the boundary of the adjustment buffer region 1710 surrounds the adjustment zone 1430. In addition, that the adjustment buffer region 1710 is larger than the adjustment zone 1430 may mean that the area of the adjustment buffer region 1710 is larger than the area of the adjustment zone 1430.

In this case, the processor may set the adjustment buffer region 1710 such that the boundary of the adjustment buffer region 1710 has a predetermined distance from the boundary of the adjustment zone 1430.

Meanwhile, if the moving agent enters the adjustment buffer region 1710, the processor may control the traveling actuator to reduce the moving speed of the moving agent. In detail, the processor may control the traveling actuator such that the moving speed of the moving agent is less than a predetermined value. In addition, if the moving agent is a robot cleaner, the processor may control the cleaner to stop the removal of the contaminants or reduce the strength of the removal of the contaminants.

In addition, the processor may control the traveling actuator such that the moving agent 100 does not enter the adjustment zone 1430.

Therefore, according to the present disclosure, it is possible to prevent the operation of the moving agent from affecting the object, and it is possible to prevent the moving agent from colliding with the object.

Meanwhile, the processor may display the indoor space map 750 and control the display to display at least one of the adjustment zone 1430 or the adjustment buffer region 1710 on the map 750.

In addition, the processor may transmit, to the terminal of the user, information about at least one of the adjustment zone 1430 or the adjustment buffer region 1710. In this case, the terminal of the user may display the indoor space map 750 and display at least one of the adjustment zone 1430 or the adjustment buffer region 1710 on the map 750.

Therefore, according to the present disclosure, there is an advantage that can guide the user to the reset restricted zone.

Figure 18:
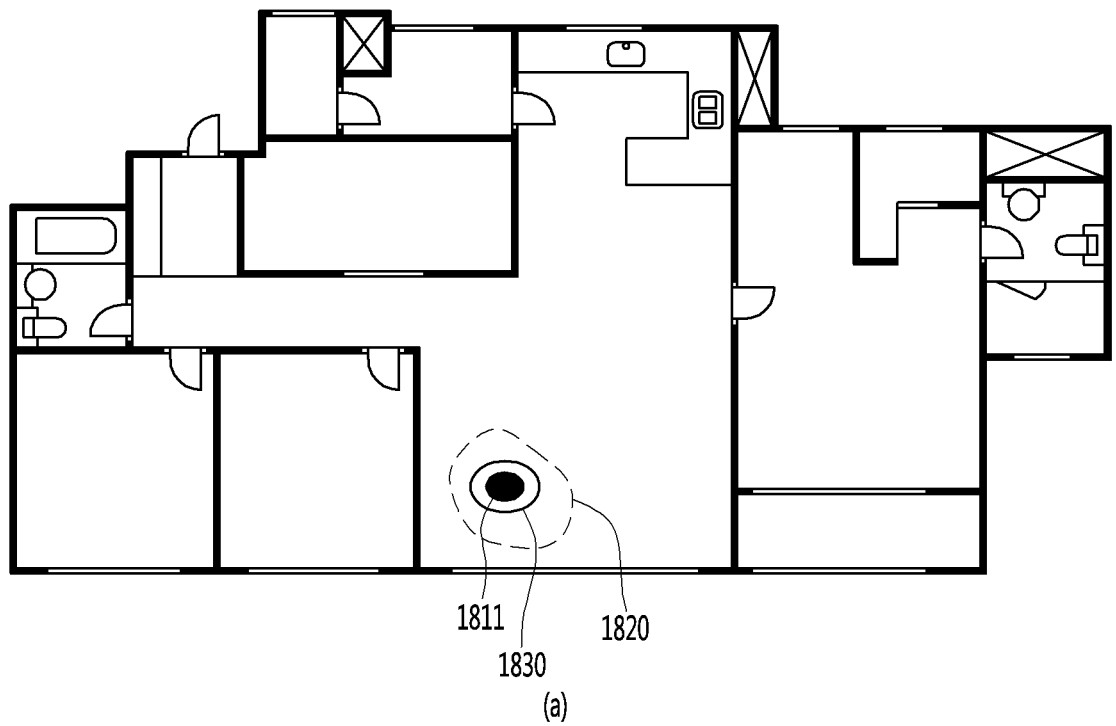
FIG. 18 is a view for describing an operation if an object moves.
Figure 18:
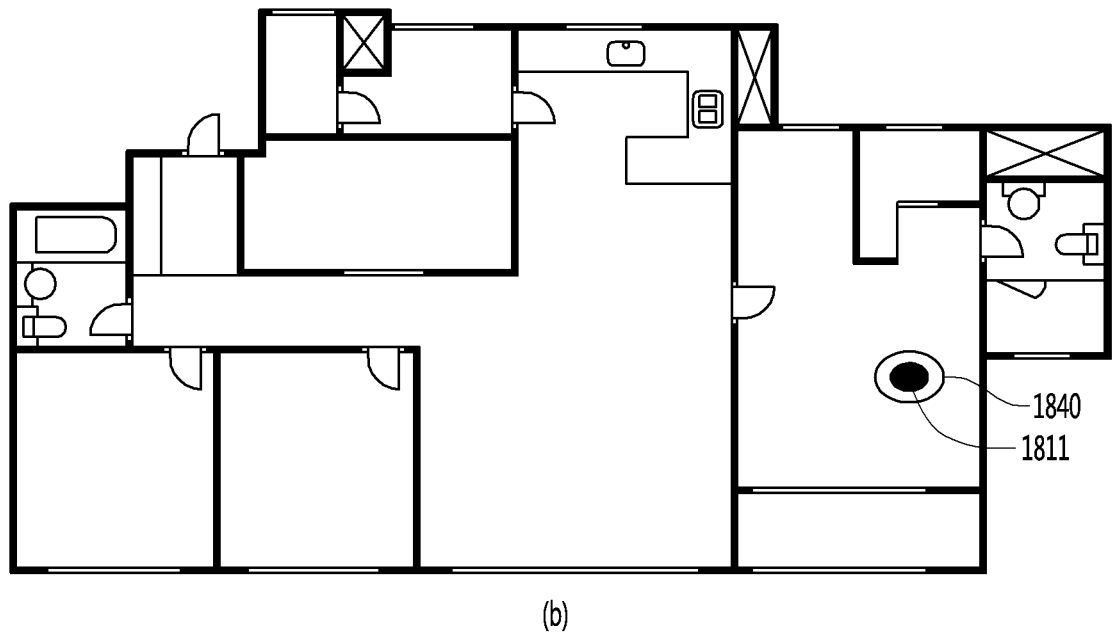

FIG. 18 is a view for describing an operation if an object moves.

Referring to FIG. 18A, an object 1811 is placed in an indoor space, and a restricted zone 1820 is set by a user. The processor of the moving agent obtains an adjustment zone 1830 by resetting the restricted zone 1820 based on an occupied region of the object 1811.

In this case, the processor may store, in a memory, identification information about the object in the restricted region 1820 set by the user. The identification information is used for determining what the object is, and may include an image of the object, a name of the object, an identification code of the object, and the like.

Meanwhile, referring to FIG. 18B, the user moves the object 1811 to another place. For example, the user may change a position of a pot.

Meanwhile, the processor may detect the object while moving the indoor space. If the identification information of the object detected at a position different from the occupied region of the object 1811 corresponds to the identification information stored in the memory, the processor may set a second adjustment zone 1840 based on the occupied region of the detected object.

That is, if the identification information of the object detected at a position different from the occupied region of the object 1811 matches the identification information stored in the memory, the processor may determine that the position of the detected object has changed. In this case, the processor may set the second adjustment zone 1840 based on the occupied region of the detected object.

Meanwhile, the above-described method of setting the adjustment zone may be applied to the method of setting the second adjustment zone 1840. In addition, the above-described operation after setting the adjustment zone may be applied to the operation after setting the second adjustment zone 1840.

Meanwhile, if the second adjustment zone 1840 is set, the processor may release the setting of the adjustment zone 1830. Therefore, the processor may control the traveling actuator to allow the moving agent to enter the adjustment zone 1830.

As described above, according to the present disclosure, the user sets the restricted zone to determine what object is to be protected, and if the object is moved, the restricted zone is automatically set, thereby improving user convenience.

Figure 19:
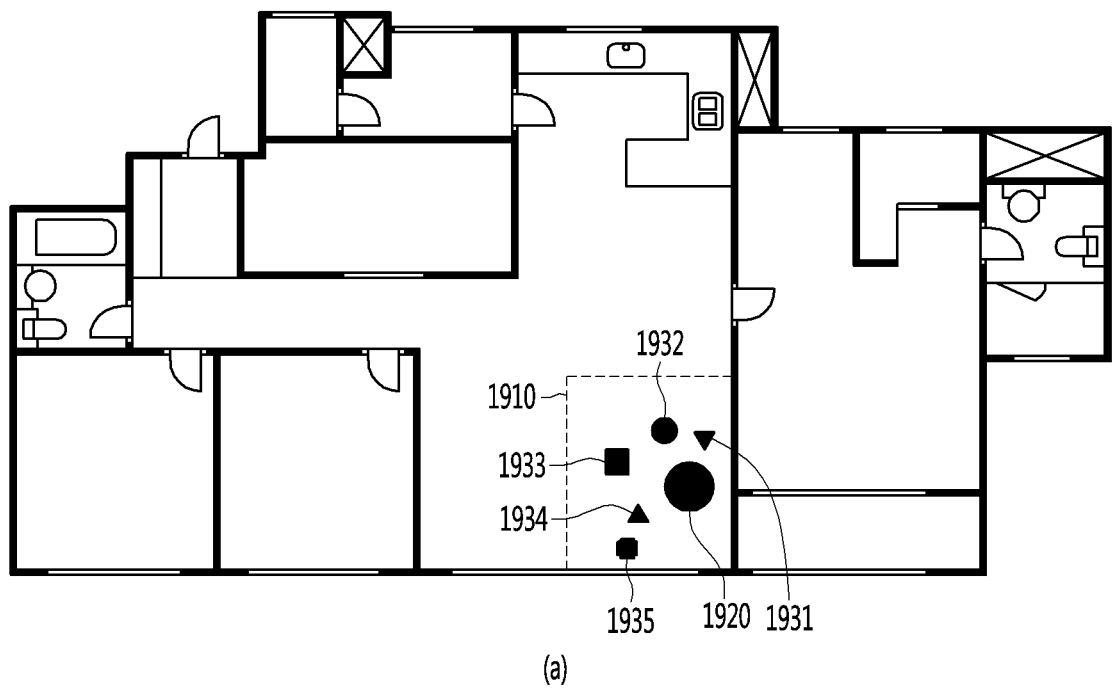
FIG. 19 is a view for describing the operation of the moving agent according to repetition of the same situation.
Figure 19:
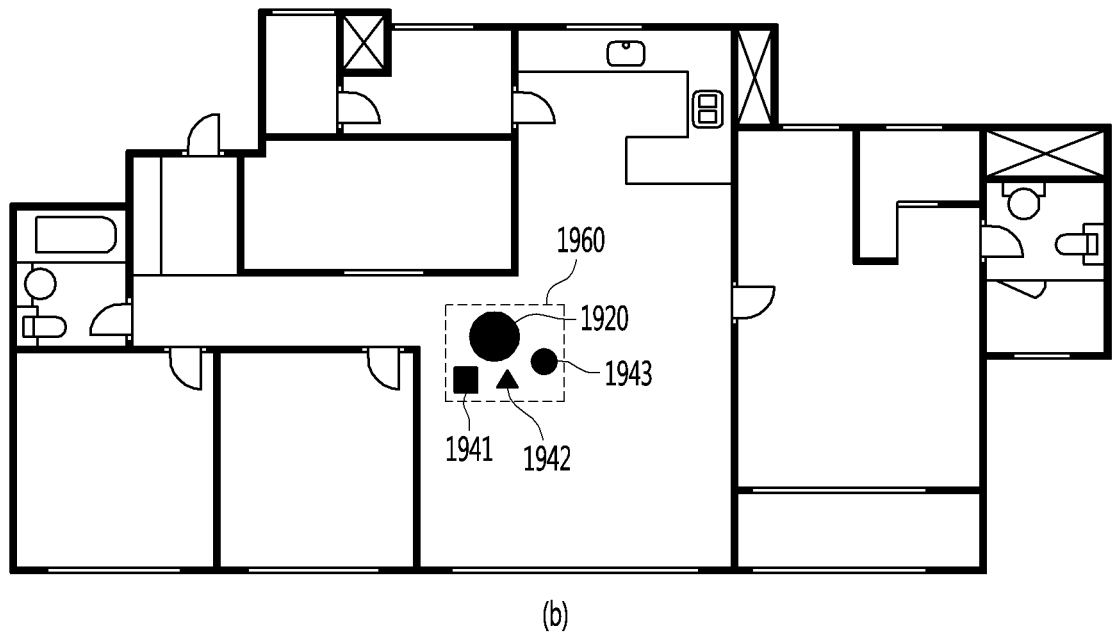

FIG. 19 is a view for describing the operation of the moving agent according to repetition of the same situation.

Referring to FIG. 19A, it is assumed that a plurality of toys 1931, 1932, 1933, 1934, and 1935 are placed in an indoor space, and the plurality of toys 1931, 1932, 1933, 1934, and 1935 surround a daughter 1920. It is assumed that a father sets a restricted zone 1910 so as not to disturb the daughter's playing.

The processor may obtain situation information related to the occupied regions of one or more objects 1931, 1932, 1933, 1934, and 1935.

In this case, the situation information may be information indicating a situation that occurs at positions where one or more objects 1931, 1932, 1933, 1934, and 1935 are located. For example, the situation information may be "daughter is playing with various toys."

In this case, the situation information may be obtained by using various factors (e.g., object, text, background, lighting, structure, arrangement, person, etc.) photographed at the positions where one or more objects 1931, 1932, 1933, 1934, and 1935 are located.

In this case, the extraction of the situation information may be performed by using the AI model (e.g., CNN).

The processor may store, in the memory, situation information related to the occupied regions of one or more objects 1931, 1932, 1933, 1934, and 1935.

Meanwhile, the processor may collect data for determining the occupied region while moving the indoor space, and extract situation information based on the data for determining the occupied region.

If the newly obtained second situation information corresponds to the situation information stored in the memory, the processor may set a new second adjustment zone.

For example, referring to FIG. 19B, the processor may obtain the second situation information indicating "the daughter is playing with various toys" based on the images of one or more objects 1942, 1942, and 1943 and the image of the daughter 1920.

If the second situation information matches the situation information stored in the memory, the processor may set the second adjustment zone.

In detail, the processor may obtain the second adjustment zone, which surrounds the second occupied region and is larger than the second occupied region, based on the second occupied regions of one or more objects 1942, 1942, and 1943 of the region from which the second situation information is obtained, Meanwhile, the object may include a person as well as an article. For example, the processor may obtain the second adjustment zone 1960, which surrounds the second occupied region and is larger than the second occupied region, based on the second occupied regions of one or more objects 1941, 1942, 1943, and 1920 of the region from which the second situation information is obtained.

As described above, according to the present disclosure, if the restricted zone is set by the user, the moving agent may set the restricted zone by itself and operate even if the restricted zone is not reset by the user.

According to the present disclosure, the restricted zone is reset more precisely, thereby preventing the moving area of the moving agent from being unnecessarily restricted, or modifying the restricted zone that is set incorrectly.

The above-described present disclosure may be implemented as a computer-readable code on a computer-readable medium in which a program is stored. The computer readable recording medium includes all types of recording devices in which data readable by a computer system is stored. Examples of the computer-readable recording medium include hard disk drives (HDD), solid state disks (SSD), silicon disk drives (SDD), read only memories (ROMs), random access memories (RAMs), compact disc read only memories (CD-ROMs), magnetic tapes, floppy discs, and optical data storage devices. Also, the computer may include the processor 180 of the terminal.

Therefore, the detailed description is intended to be illustrative, but not limiting in all aspects. It is intended that the scope of the present disclosure should be determined by the rational interpretation of the claims as set forth, and the modifications and variations of the present disclosure come within the scope of the appended claims and their equivalents.

What is claimed is:

1. An artificial intelligence moving agent comprising:
   an actuator configured to drive the artificial intelligence moving agent;
   at least one sensor configured to obtain data; and
   at least one processor configured to:
      determine an occupied region of one or more objects based on the obtained data; and
      obtain an adjustment zone by resetting a restricted zone based on the determined occupied region of the one or more objects, wherein the adjustment zone corresponds to a portion of the restricted zone that may be reset and the restricted zone corresponds to a zone that the moving agent is prohibited from entering.

2. The artificial intelligence moving agent of claim 1, wherein the at least one processor is further configured to determine whether to reset the restricted zone by comparing the restricted zone with the determined occupied region of the one or more objects.

3. The artificial intelligence moving agent of claim 2, wherein the restricted zone is reset when a ratio of an area of the determined occupied region of the one or more objects to an area of the restricted zone is less than a first predetermined value.

4. The artificial intelligence moving agent of claim 2, wherein the restricted zone is reset when at least a part of the occupied region of the one or more objects is not positioned within the restricted zone.

5. The artificial intelligence moving agent of claim 2, wherein the restricted zone is determined to be reset when a boundary of the restricted zone and a boundary of the determined occupied region of the one or more objects are within a first predetermined distance.

6. The artificial intelligence moving agent of claim 1, wherein the at least one sensor comprises at least one of a camera, a radar, a lidar, or an ultrasonic sensor.

7. The artificial intelligence moving agent of claim 6, wherein:
   the obtained data corresponds to an image captured by the camera; and
   determining the occupied region of the one or more objects further comprises inputting the captured image to an artificial intelligence model configured for detecting objects within images.

8. The artificial intelligence moving agent of claim 1, wherein the data for determining the occupied region is obtained when the artificial intelligence moving agent enters a buffer region, wherein the buffer region surrounds the restricted zone and is larger than the restricted zone.

9. The artificial intelligence moving agent of claim 8, wherein the at least one processor is further configured to control the actuator to reduce a moving speed when the artificial intelligence moving agent enters the buffer region.

10. The artificial intelligence moving agent of claim 1, wherein the adjustment zone surrounds the determined occupied region of the one or more objects and is larger than the determined occupied region.

11. The artificial intelligence moving agent of claim 10, wherein a ratio of an area of the determined occupied region of the one or more objects to an area of the restricted zone is greater than a second predetermined value.

12. The artificial intelligence moving agent of claim 11, wherein the adjustment zone is smaller than the restricted zone.

13. The artificial intelligence moving agent of claim 10, wherein a distance between a boundary of the determined occupied region of the one or more objects and a boundary of the adjustment zone is greater than a second predetermined distance.

14. The artificial intelligence moving agent of claim 10, wherein the adjustment zone corresponds to a margin region that surrounds a particular occupied region of one object from among the one or more objects, wherein the margin region is larger than the particular occupied region.

15. The artificial intelligence moving agent of claim 10, wherein the determined occupied region of the one or more objects comprises a plurality of detailed occupied regions each corresponding to an object from the one or more objects, and
   wherein the adjustment zone comprises a plurality of detailed margin regions each corresponding to a detailed occupied region from among the plurality of detailed occupied regions.

16. The artificial intelligence moving agent of claim 15, wherein the adjustment zone is obtained by connecting the plurality of detailed margin regions.

17. The artificial intelligence moving agent of claim 1, further comprising at least one memory,
   wherein the at least one processor is further configured to:
      store identification information about the one or more objects in the at least one memory; and
      set a second adjustment zone based on a new occupied region of a detected object from among the one or more objects when identification information about the detected object located at a position that is different from the determined occupied region corresponds to the identification information stored in the at least one memory.

18. The artificial intelligence moving agent of claim 1, further comprising at least one memory,
   wherein the at least one processor is further configured to:
      obtain situational information related to the determined occupied region of the one or more objects based on the obtained data;
      store the obtained situational information in the least one memory; and
      set a second adjustment zone when newly obtained second situational information corresponds to the obtained situational information stored in the least one memory.

19. The artificial intelligence moving agent of claim 18, wherein the at least one processor is further configured to obtain the second adjustment zone based on a second occupied region of the one or more objects of a region from which a second situational information is obtained, wherein the second adjustment zone surrounds the second occupied region of the one or more objects and is larger than the second occupied region.

20. An artificial intelligence robot cleaner comprising:
a actuator configured to drive the artificial intelligence robot cleaner;
a cleaner configured to remove a contaminant;
at least one sensor configured to obtain data for determining an occupied region; and
at least one processor configured to:
determine the occupied region of one or more objects based on the obtained data; and
obtain an adjustment zone by resetting a restricted zone based on the determined occupied region of the one or more objects, wherein the adjustment zone corresponds to at least a portion of the restriction zone that may be reset and the restricted zone corresponds to a zone that the artificial intelligence robot cleaner is prohibited from entering.

* * * * *